(12) United States Patent
De Bonet

(10) Patent No.: US 10,787,187 B1
(45) Date of Patent: Sep. 29, 2020

(54) SELF-BAGGING CARTS

(71) Applicant: Amazon Technologies, Inc., Seattle, WA (US)

(72) Inventor: Jeremy Samuel De Bonet, Southborough, MA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 14/752,196

(22) Filed: Jun. 26, 2015

(51) Int. Cl.
| | |
|---|---|
| *B62B 3/18* | (2006.01) |
| *A47F 10/04* | (2006.01) |
| *B62B 3/14* | (2006.01) |
| *A47F 5/00* | (2006.01) |
| *A47F 10/00* | (2006.01) |

(52) U.S. Cl.
CPC .......... *B62B 3/1464* (2013.01); *A47F 5/0006* (2013.01); *A47F 10/04* (2013.01); *B62B 3/146* (2013.01); *B62B 3/18* (2013.01); *A47F 2010/005* (2013.01)

(58) Field of Classification Search
CPC ........ A47F 13/085; A47F 10/02; B62B 1/266; B62B 3/106; B62B 3/1464; B62B 2202/26
USPC ................................................ 211/85.15, 12
See application file for complete search history.

(56) References Cited

U.S. PATENT DOCUMENTS

| | | | | |
|---|---|---|---|---|
| 779,551 | A * | 1/1905 | Letts ..................... | A47F 5/0025 211/12 |
| D167,566 | S * | 8/1952 | Fiori ............................. | 211/12 |
| 2,890,060 | A * | 6/1959 | Ott .......................... | B62B 3/02 248/98 |
| 3,352,411 | A * | 11/1967 | Schwarzkopf ........ | A47F 13/085 206/493 |
| 3,380,579 | A | 4/1968 | Pinto | |
| 3,653,619 | A | 4/1972 | Plum | |
| 4,199,043 | A | 4/1980 | Lankester et al. | |
| 4,200,945 | A * | 5/1980 | Ellis ...................... | B42D 17/00 281/43 |
| 4,550,930 | A * | 11/1985 | Proffit .................... | B62B 5/085 224/274 |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Brent W Herring
(74) *Attorney, Agent, or Firm* — Athorus, PLLC

(57) ABSTRACT

A mobile cart includes sets of arms from which bags may be suspended. The arms may be separated by a predetermined distance. Holes for suspending the bags from such arms may be laterally formed in such bags and separated by the predetermined distance. The arms may be extended when the mobile cart is being used to retrieve items from a materials handling facility, such as a warehouse or retail establishment, and retracted when the mobile cart is not in service. An open or expanded bag may be suspended near free ends of such arms, thereby enabling one or more workers to place items therein, while one or more closed or collapsed bags may be suspended at mounting ends of such arms and stored until one or more of such bags is desired. When the open bag is filled with desired items, the open bag may be removed from the arms.

21 Claims, 28 Drawing Sheets

(56) References Cited

U.S. PATENT DOCUMENTS

| | | | |
|---|---|---|---|
| 4,560,096 A * | 12/1985 | Lucas | B62B 3/1464 220/9.4 |
| 4,576,388 A * | 3/1986 | Pope | B62B 3/1464 248/100 |
| 4,683,609 A | 8/1987 | Trubiano | |
| 4,721,317 A * | 1/1988 | Avot | B62B 3/1464 248/101 |
| 4,974,799 A * | 12/1990 | Palmer | B62B 3/1464 224/411 |
| 5,125,604 A | 6/1992 | Vrooman et al. | |
| 5,269,605 A * | 12/1993 | Nguyen | B65D 33/001 206/554 |
| 5,335,788 A | 8/1994 | Beasley et al. | |
| 5,346,310 A * | 9/1994 | Nguyen | B65D 33/001 206/554 |
| 5,385,358 A | 1/1995 | Adamson | |
| 5,397,140 A | 3/1995 | Mainard | |
| 5,464,098 A * | 11/1995 | Tseng | A47F 13/085 206/554 |
| 5,678,842 A * | 10/1997 | Hook | B62B 1/045 248/98 |
| 5,836,332 A * | 11/1998 | Mick | B62B 3/1436 135/124 |
| 5,915,722 A * | 6/1999 | Thrasher | B62B 1/12 280/649 |
| 6,003,894 A * | 12/1999 | Maher | B62B 3/106 248/100 |
| 6,199,878 B1 | 3/2001 | Masserant et al. | |
| 6,328,329 B1 | 12/2001 | Smith | |
| 6,354,612 B1 | 3/2002 | Adamson | |
| 6,446,810 B1 | 9/2002 | Huang et al. | |
| 6,880,851 B1 * | 4/2005 | Summers | B62B 1/266 280/43.1 |
| 7,225,980 B2 | 6/2007 | Ku et al. | |
| 7,258,352 B2 * | 8/2007 | Odgers | B62B 1/042 280/47.2 |
| 7,273,197 B1 | 9/2007 | Huggins et al. | |
| 7,281,731 B2 * | 10/2007 | Shamah | B62B 1/12 280/639 |
| 7,584,559 B2 | 9/2009 | Agudelo | |
| D606,273 S * | 12/2009 | Anderson | D34/18 |
| 7,949,568 B2 | 5/2011 | Fano et al. | |
| 8,009,864 B2 | 8/2011 | Linaker et al. | |
| 8,067,072 B2 | 11/2011 | Tan | |
| 8,175,925 B1 | 5/2012 | Rouaix | |
| 8,189,855 B2 | 5/2012 | Opalach et al. | |
| 8,423,431 B1 | 4/2013 | Rouaix et al. | |
| 8,630,924 B2 | 1/2014 | Groenevelt et al. | |
| 8,688,598 B1 | 4/2014 | Shakes et al. | |
| 8,764,032 B1 | 7/2014 | Dantice | |
| 8,814,179 B1 | 8/2014 | McCormick | |
| 8,905,411 B1 * | 12/2014 | Blanton | B62B 3/005 280/33.991 |
| 8,931,744 B1 | 1/2015 | McLafferty | |
| 8,979,115 B1 * | 3/2015 | Baron | B62B 3/027 280/43 |
| 9,033,348 B1 * | 5/2015 | Vadnais | B62B 1/10 280/47.28 |
| 9,145,156 B2 * | 9/2015 | Pena, III | B62B 3/1436 |
| 9,290,196 B1 | 3/2016 | Siegel | |
| 9,473,747 B2 | 10/2016 | Kobres et al. | |
| 2003/0002712 A1 | 1/2003 | Steenburgh et al. | |
| 2004/0181467 A1 | 9/2004 | Raiyani et al. | |
| 2005/0199667 A1 | 9/2005 | Cappellino et al. | |
| 2006/0145437 A1 * | 7/2006 | Odgers | B62B 1/042 280/47.19 |
| 2006/0175778 A1 * | 8/2006 | Rose | B62B 3/1436 280/33.992 |
| 2007/0096437 A1 * | 5/2007 | Watson | B62B 3/027 280/651 |
| 2007/0186515 A1 * | 8/2007 | Ruetten | A47F 13/085 53/502 |
| 2008/0015956 A1 * | 1/2008 | Regard | A47F 9/042 705/28 |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2008/0142560 A1 * | 6/2008 | Lim | B60R 7/08 224/543 |
| 2008/0247685 A1 | 10/2008 | Kim | |
| 2009/0121017 A1 | 5/2009 | Cato et al. | |
| 2009/0224495 A1 * | 9/2009 | Anderson | B62B 3/027 280/47.26 |
| 2009/0245573 A1 | 10/2009 | Saptharishi et al. | |
| 2009/0283989 A1 * | 11/2009 | Abecassis | B62B 3/027 280/651 |
| 2009/0289019 A1 * | 11/2009 | Alvarado | A47F 13/085 211/85.15 |
| 2010/0200525 A1 * | 8/2010 | Keyvanloo | A47B 96/07 211/59.2 |
| 2011/0011936 A1 | 1/2011 | Morandi et al. | |
| 2012/0207411 A1 | 8/2012 | Roessiger | |
| 2012/0284132 A1 | 11/2012 | Kim et al. | |
| 2013/0076898 A1 | 3/2013 | Philippe et al. | |
| 2013/0253700 A1 | 9/2013 | Carson et al. | |
| 2014/0021698 A1 * | 1/2014 | Beckman | B62B 3/027 280/651 |
| 2014/0225339 A1 * | 8/2014 | Damian, III | B62B 5/0013 280/33.992 |
| 2014/0279294 A1 | 9/2014 | Field-Darragh et al. | |
| 2015/0019391 A1 | 1/2015 | Kumar et al. | |
| 2015/0073907 A1 | 3/2015 | Purves et al. | |
| 2015/0128535 A1 * | 5/2015 | McInnis | A47F 13/085 53/486 |
| 2015/0197262 A1 | 7/2015 | Sonnendoder et al. | |
| 2015/0197388 A1 * | 7/2015 | Maglio, Jr. | B65D 33/004 53/435 |
| 2016/0200339 A1 | 7/2016 | Dhand et al. | |

OTHER PUBLICATIONS

Cristian Pop, "Introduction to the BodyCom Technology", Microchip AN1391, May 2, 2011, pp. 1-26, vol. AN1391, No. DS01391A, Publisher: 2011 Microchip Technology Inc.

Bishop, Todd. "Whole Foods prototype puts Kinect on shopping cart, follows people around store," GeekWire, Feb. 27, 2012, available at https://www.geekwire.com/2012/microsoft-kinect-shopping-cart-foods-prototype/, 9 pages.

Warmoth, Brian. "7 Weird and Brilliant Shopping Cart Design Innovations," Retail Dive, Jan. 28, 2013, available at https://www.retaildive.com/news/7-weird-and-brilliant-shopping-cart-design-innovations/94043/, 6 pages.

* cited by examiner

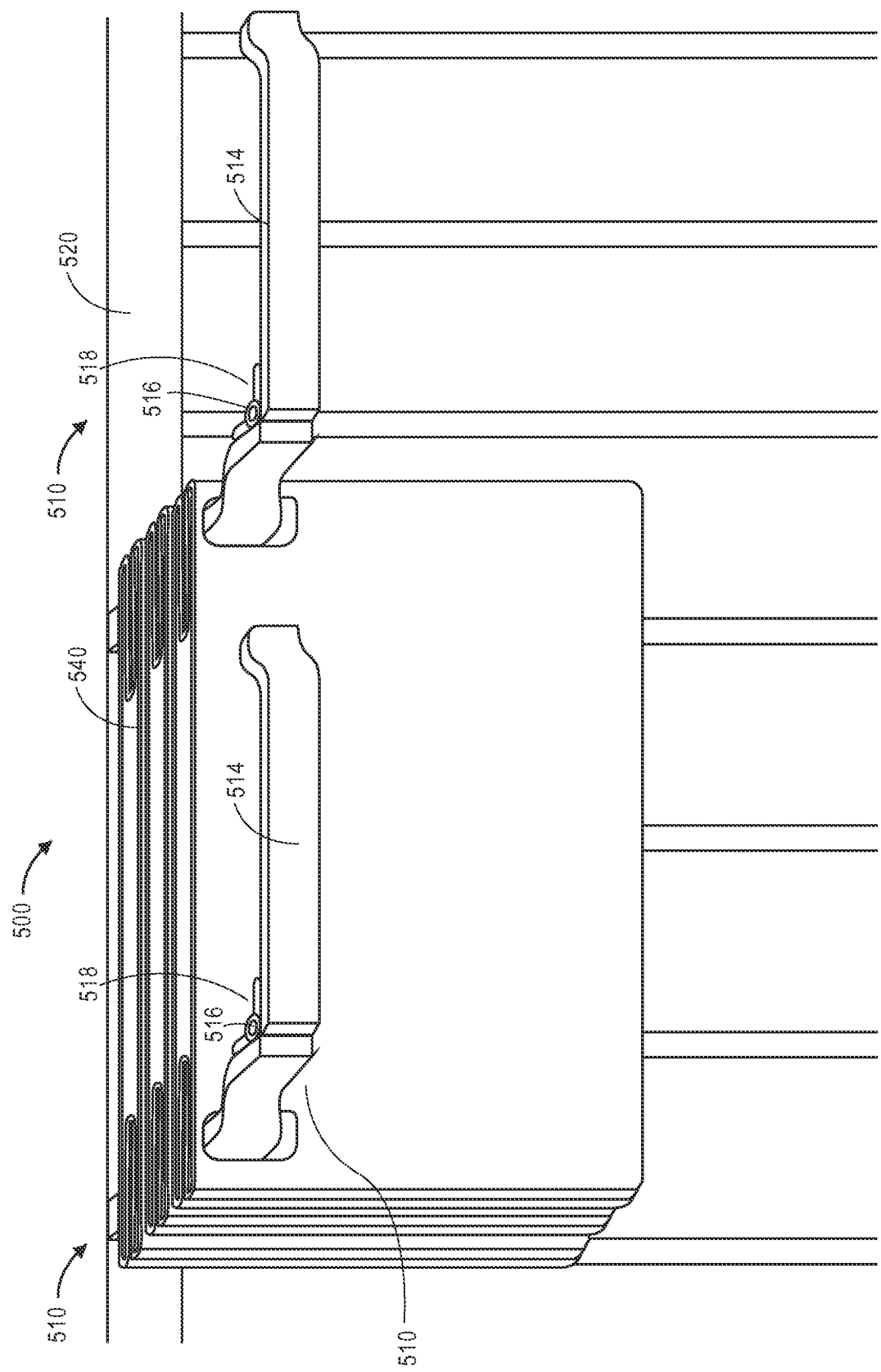

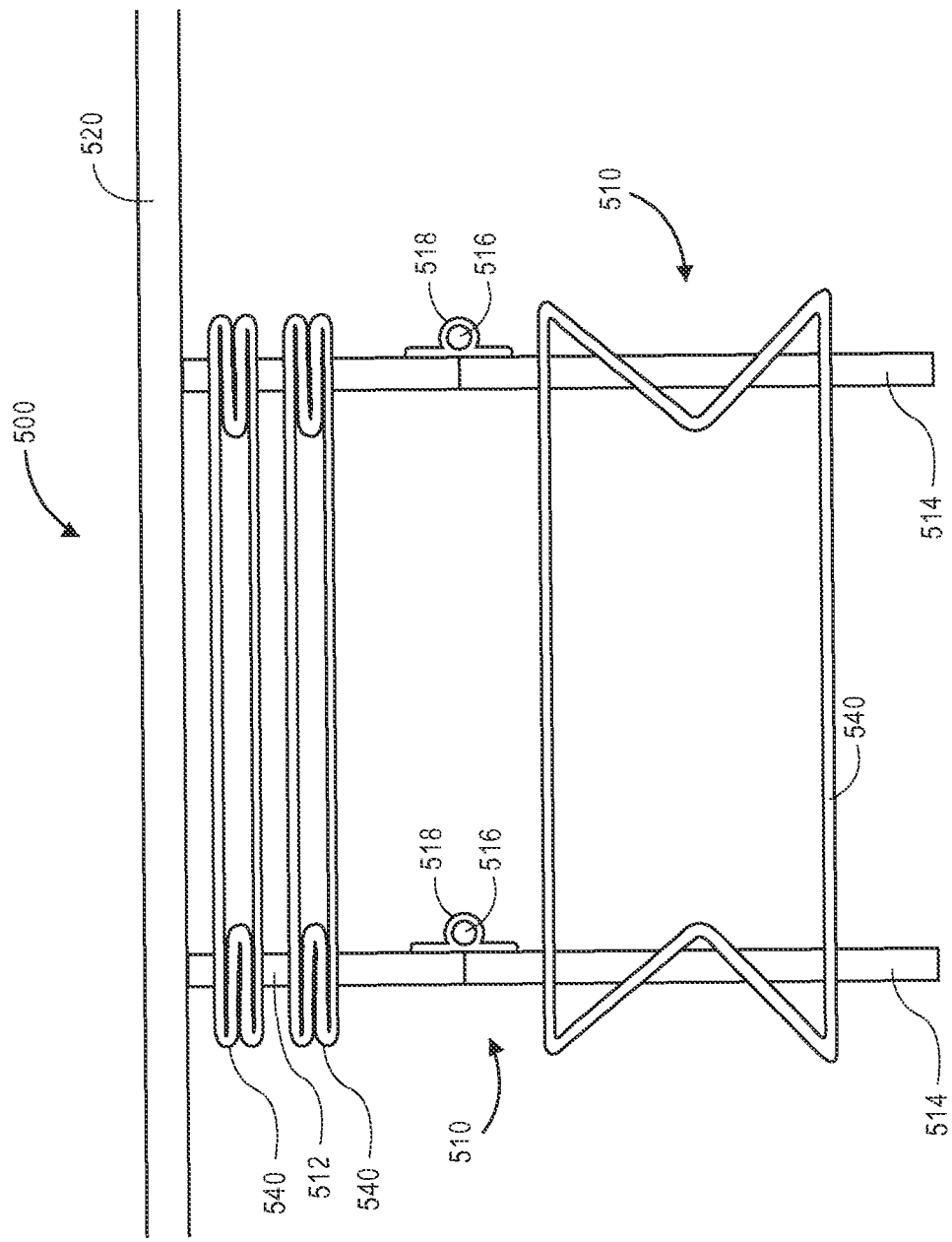

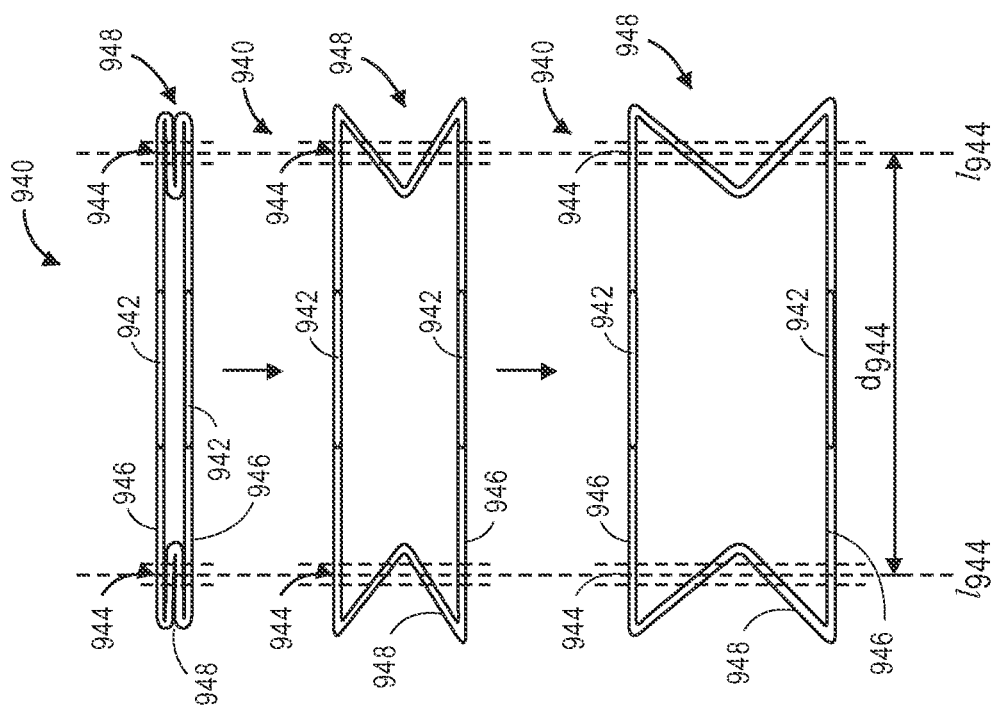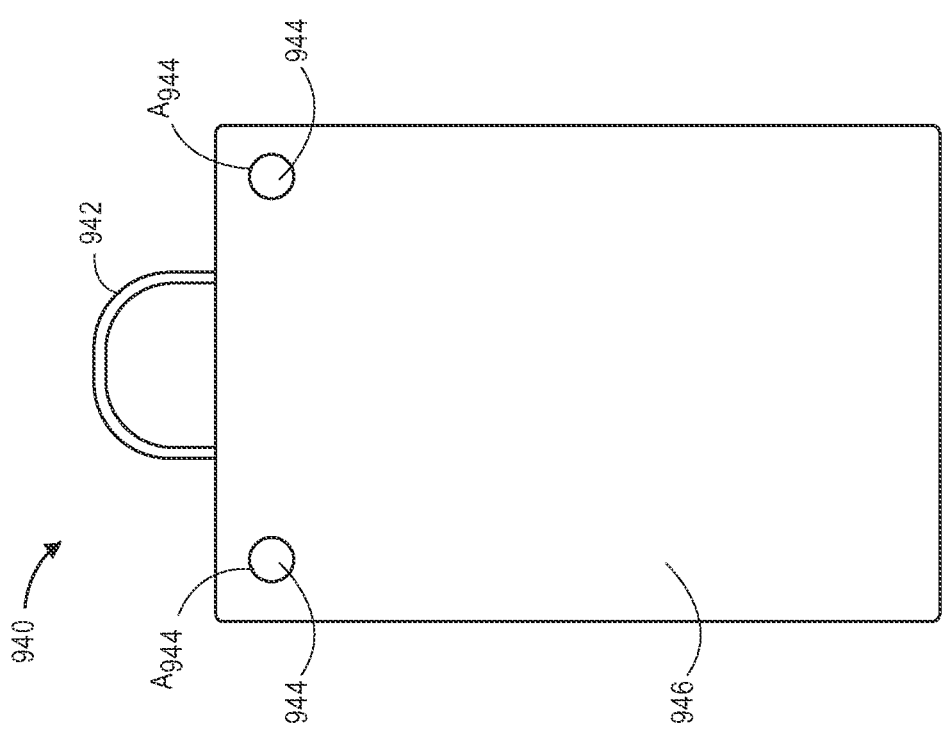
FIG. 9A
FIG. 9B

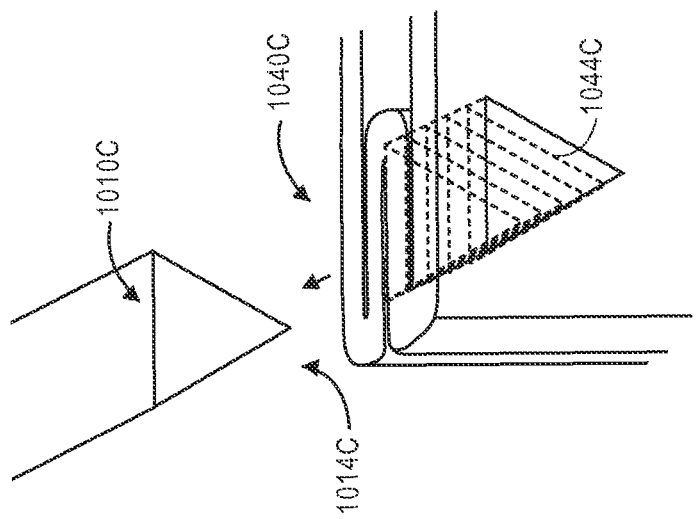
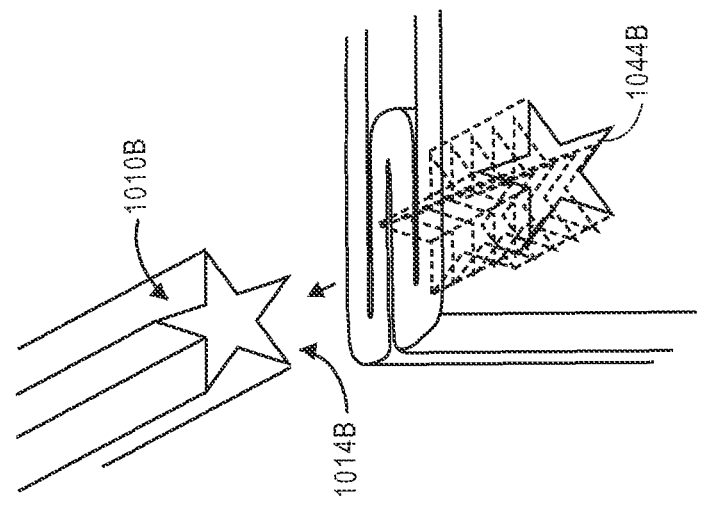
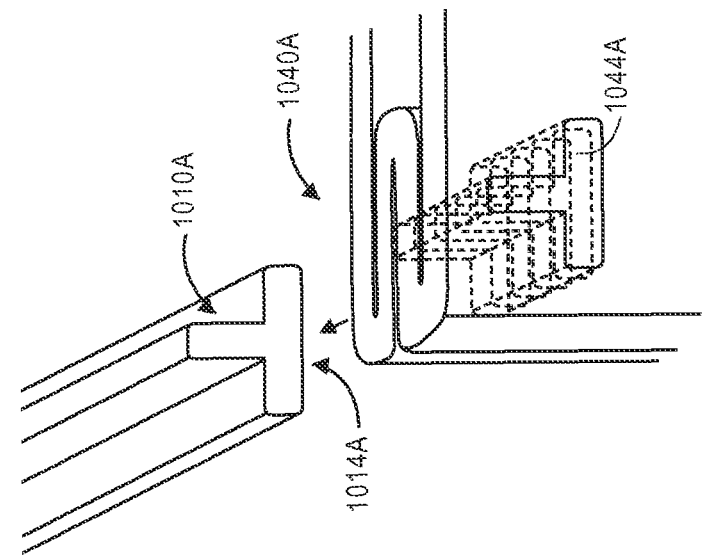

SELF-BAGGING CARTS

BACKGROUND

Materials handling facilities such as warehouses or retail stores often provide users with carts to facilitate the processes by which such users may locate, identify, retrieve and transport items at such facilities. For example, when a user identifies one or more items that he or she desires on a shelf or other location within a materials handling facility, the user may remove the items from the shelf or other location, and place the items into a cart, e.g., a durable vessel formed from metal or plastic that is configured to travel on wheels, before continuing to travel throughout the facility in search of one or more other items.

When the user has identified each of the items that he or she desires, or is otherwise satisfied with the items that he or she has retrieved, the user may transport the items in the cart to an intended destination within the materials handling facility, such as a distribution station or cash register, and transition the items to a human operator or an automated agent. Typically, upon arriving at the intended destination, the user or the human operator manually removes the items from the cart, evaluates or registers the items, and places the items into one or more bags or other item carriers. The user may then transport the items within such item carriers to yet another destination, e.g., to his or her automobile, workstation or home, by manually carrying the item carriers to the other location, or by transporting the item carriers to the destination within the cart.

Thus, retrieving items from shelves or other locations within a materials handling facility and placing such items into a portable item carrier is commonly a two-step process. First, the items must be retrieved from the shelves or other locations and placed into a cart, and second, the items must be removed from the cart and placed into a bag or other item carrier. The intervening actions required to transition items from a shelf or other location into the bag or other item carrier, namely, to insert the items into a cart and remove the items therefrom, necessarily slow the process by which items are retrieved from a materials handling facility and occasionally tend to mitigate the advantages that carts provide.

BRIEF DESCRIPTION OF THE DRAWINGS

FIGS. 5A through 5E are views of components of one self-bagging cart in accordance with implementations of the present disclosure.

FIGS. 9A through 9C are views of one bag in accordance with implementations of the present disclosure.

FIGS. 10A through 10C are views of bags in accordance with implementations of the present disclosure.

DETAILED DESCRIPTION

Figure 1A:
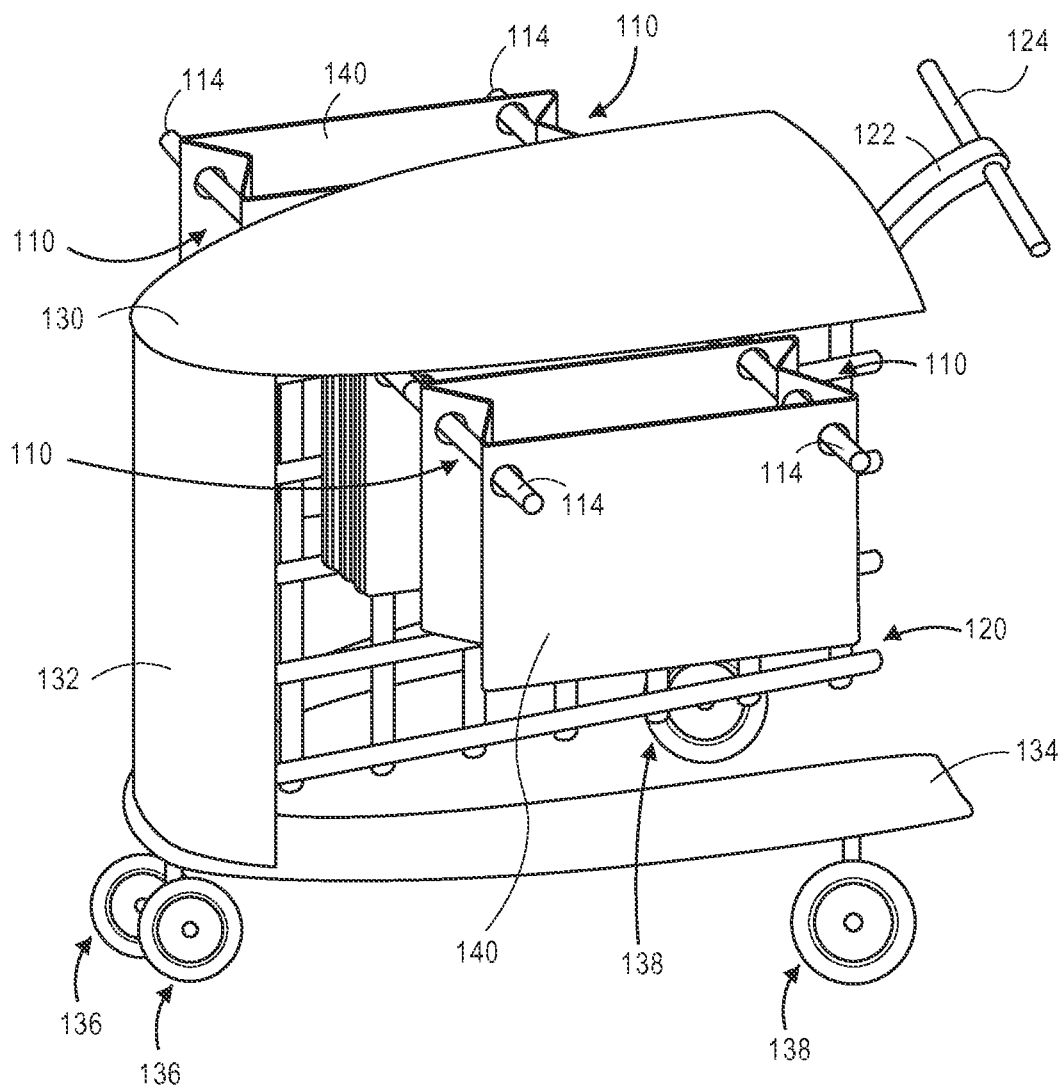
FIGS. 1A through 1E are views of components of one self-bagging cart in accordance with implementations of the present disclosure.

As is set forth in greater detail below, the present disclosure is directed to self-bagging carts that may be utilized by users in materials handling facilities or like environments. More specifically, the systems and methods disclosed herein include carts having rigid frames with folding or retractable arms extending substantially normal from external surfaces of such carts, with one or more bags or other flexible item carriers suspended from such arms. In some implementations, a self-bagging cart includes a pair of folding or retractable arms that are separated by a predefined distance, and a bag including one or more slots or other perforations that pass through various panels or layers of the bag and are also separated by the predefined distance. Each of the arms extends from the self-bagging cart in a manner that causes the bag to remain open and able to receive one or more items therein without further action or intervention by the user. Thus, a user of the cart may ambulate through a materials handling facility with the cart, identify an item of interest, place the item of interest in one of the bags, and continue searching for other items of interest, or report to a predetermined destination, such as a distribution station or cash register, prior to departing the materials handling facility. Subsequently, the user may then retrieve the bag including the item of interest from the cart, and depart the materials handling facility with the bag and the item of interest therein. Additionally, when the cart is not in use, the arms may be folded or retracted, thereby effectively reducing an area in space (e.g., a footprint) occupied by the cart. Moreover, two or more of the carts may be configured to nest or otherwise functionally join with one another, so that the carts may be easily stored or transported in bulk.

Referring to FIGS. 1A through 1E, perspective, side, top and front views of components of one self-bagging cart 100 in accordance with the present disclosure are shown. The cart 100 includes a plurality of arms 110 provided on each side of a frame 120 and a plurality of bags 140 suspended from the arms 110.

As is shown in FIGS. 1A through 1E, each of the arms 110 extends substantially normal to the frame 120 in a manner similar to a wing. Each of the arms 110 includes a proximal end or mounting section 112 and a distal end or extension 114 that are joined by a hinge 116. The extension 114 is adapted to rotate about the hinge 116 between a first position (as shown in FIGS. 1A through 1E) with respect to the frame 120 in which the extension 114 extends in a rigid manner and along an axis of the mounting section 112, and a second position (not shown) with respect to the frame 120 in which the extension 114 is folded or retracted toward or alongside the frame 120 and at a substantially perpendicular angle with respect to the axis of the mounting section 112.

A torsion spring 118 provided on the hinge 116 biases or urges the extension 114 into the first position with respect to the frame 120, and a force that overcomes the biasing or urging of the torsion spring 118 may cause the extension 114 to rotate to the second position with respect to the frame 120. The torsion spring 118 may be any type of deflectable extension or compression device capable of absorbing a force or moment and returning a reciprocal force or moment proportional to an extent of deflection or rotation and in a direction opposite to the deflection or rotation. In some implementations, the torsion spring 118 may be a standard metal coil spring mounted to the mounting section 112, the extension 114 and/or the hinge 116, and aligned to rotate about the hinge 116 in response to forces or moments. In some other implementations, the torsion spring 118 may be a low-load plastic compression spring formed from plastics or polymers such as a polyester-based elastomer.

Alternatively, in other implementations, the arms 110 may include biasing elements other than torsion springs, including but not limited to any type of springs (e.g., compression springs, leaf springs or extension springs), or any other extension or compression devices, as well as elements that provide biasing or urging through the use of other components or systems, such as pulleys. The arms 110 may further include one or more latches or other components (not shown) configured to manually lock the extensions 114 in the first position or the second position with respect to the mounting sections 112, or in any intervening position.

Although each of the arms 110 of FIGS. 1A through 1E is shown as a slender right circular cylinder, the arms 110 may take any shapes or forms, and may feature cross-sections that are not only circular but also rectangular (e.g., square), triangular, elliptical or of any other regular or irregular shape in accordance with the present disclosure.

As is further shown in FIGS. 1A through 1E, the arms 110 are mounted to the frame 120, which further includes a pair of handle mounts 122 and a handle 124. Additionally, according to the implementation of the cart 100 shown in FIGS. 1A through 1E, the frame 120 is axially aligned with respect to a direction of travel of the cart 100, with each of the sides including two arms 110 mounted thereto, and with one of the handle mounts 122 mounted to rear ends of the sides. The handle 124 is shown as mounted to each of the handle mounts 122.

Figure 1B:
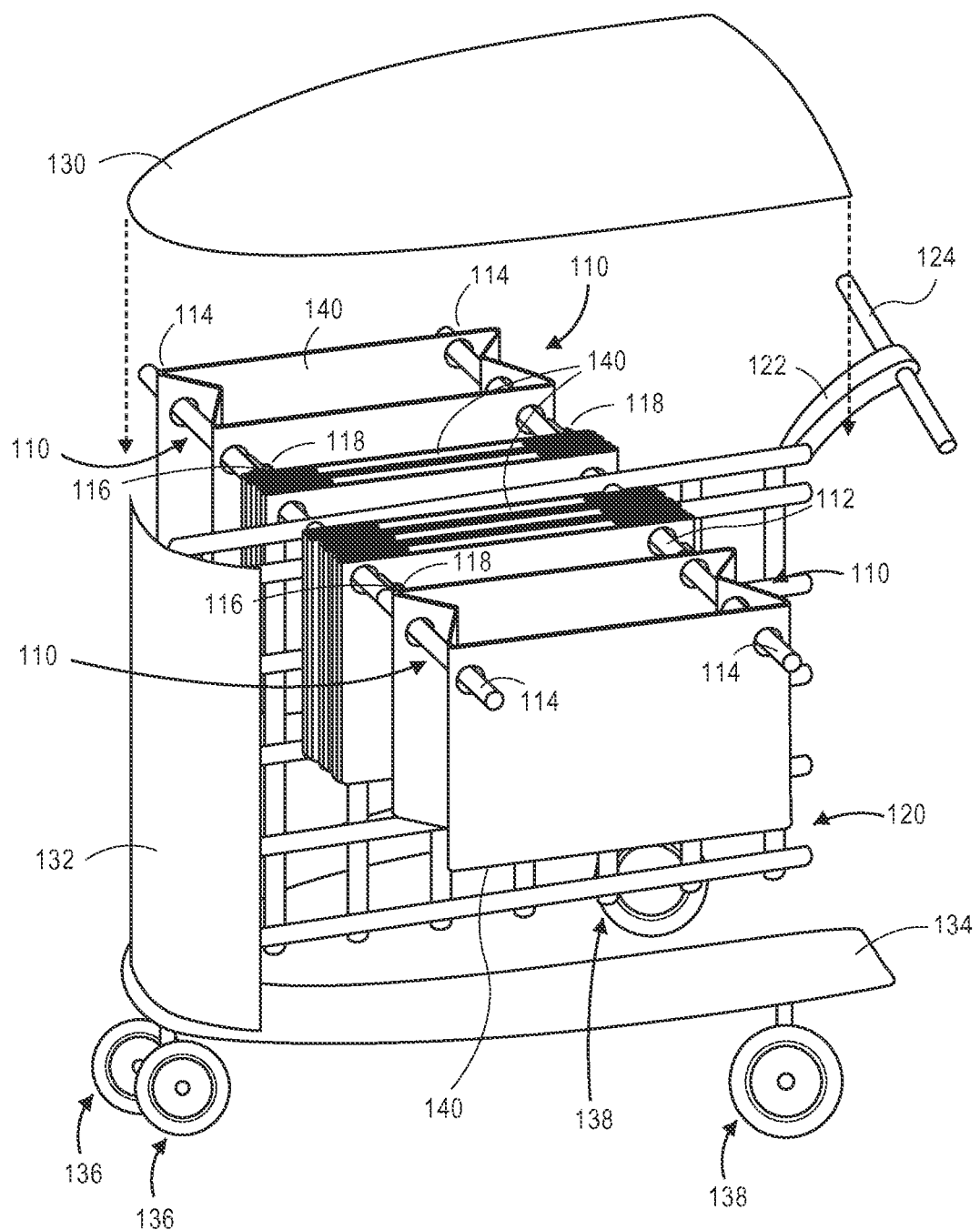
Figure 1C:
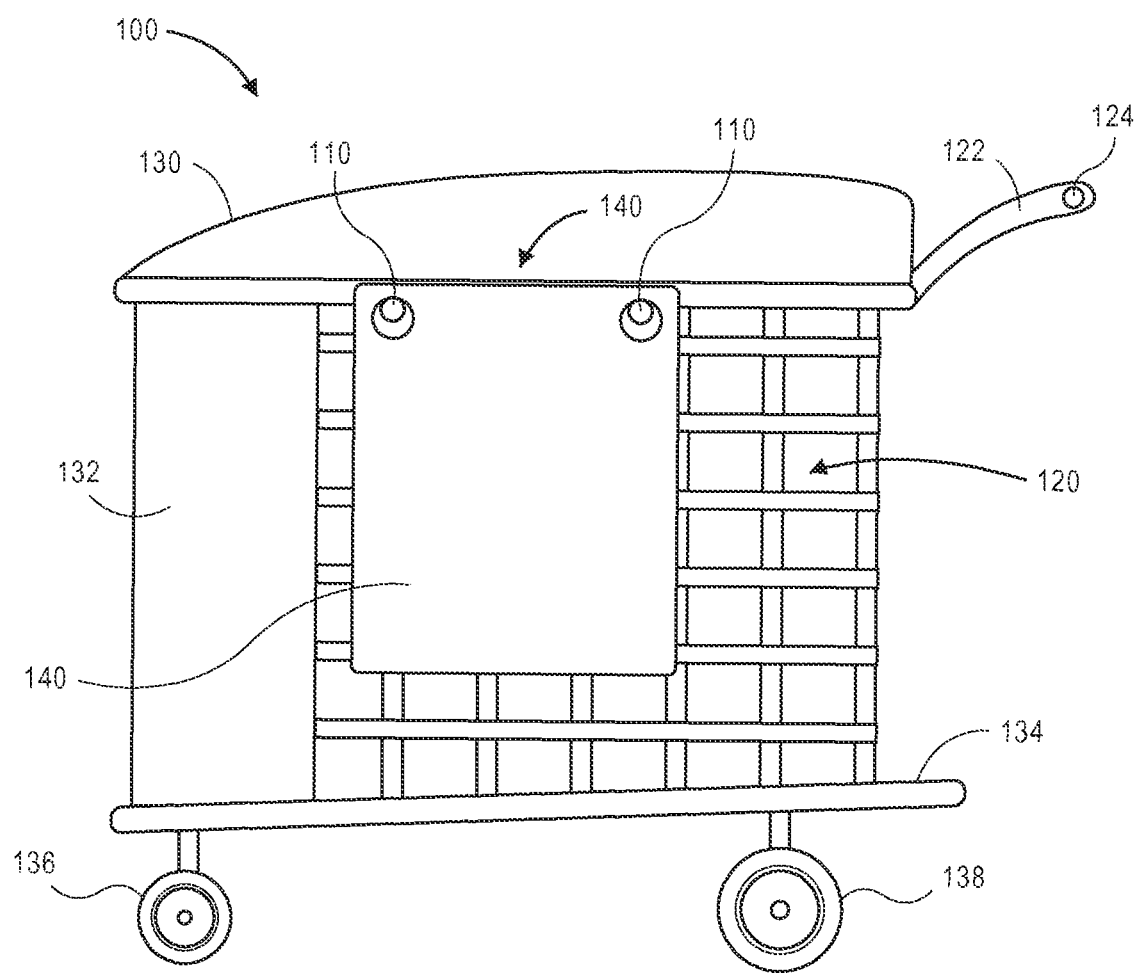
Figure 1D:
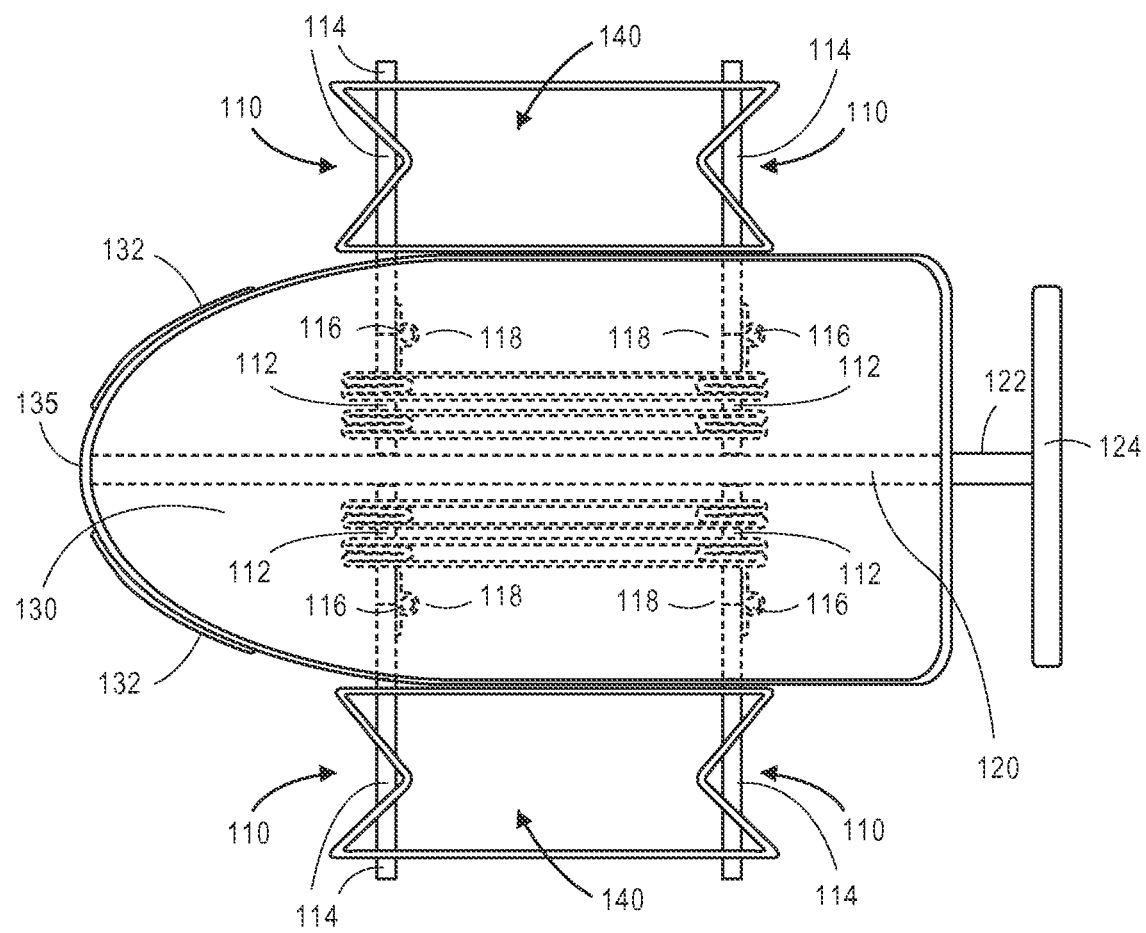
Figure 1E:
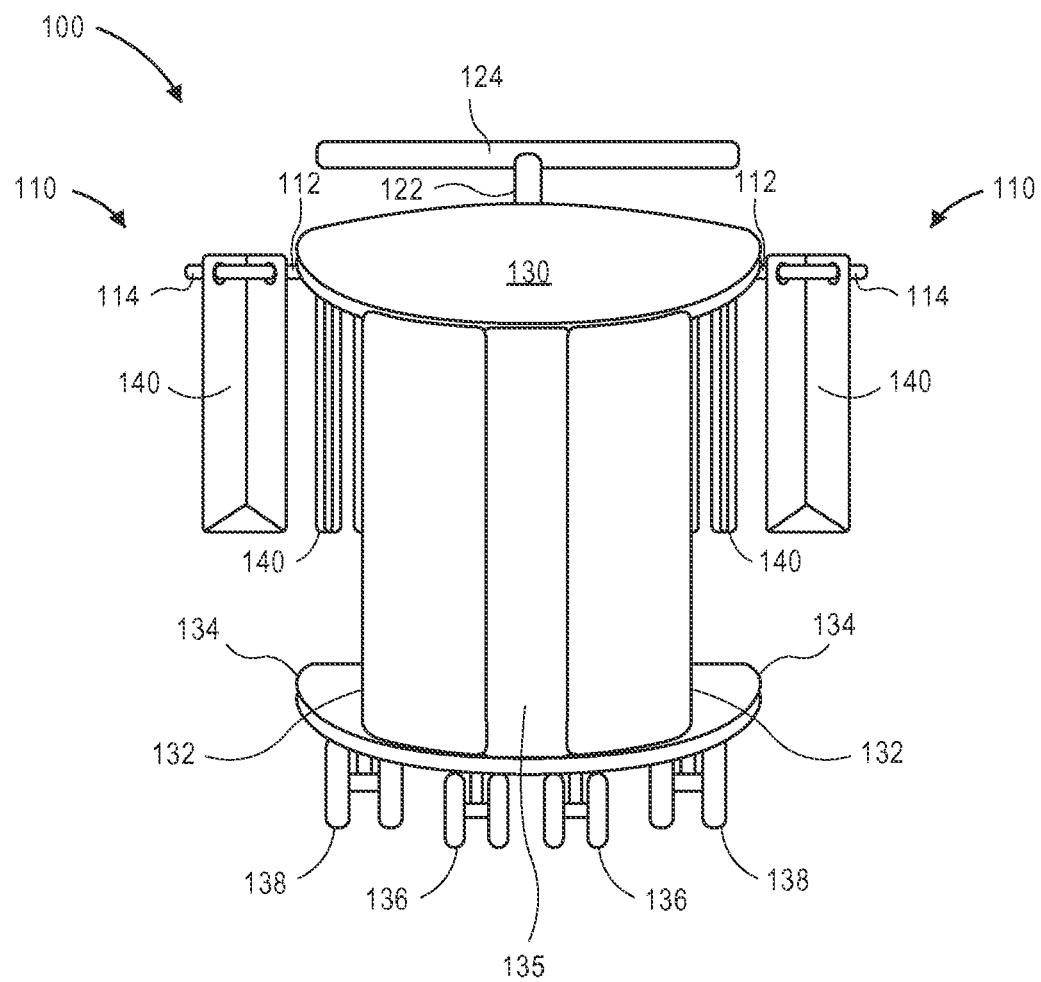

The frame 120, the handle mounts 122 and the handle 124 may be formed from any suitable materials such as plastics (e.g., thermosetting plastics such as epoxy or phenolic resins, polyurethanes or polyesters, as well as polyethylenes, polypropylenes or polyvinyl chlorides), wood (e.g., woods with sufficient strength properties such as ash), metals (e.g., lightweight metals such as aluminum, or metals of heavier weights including alloys of steel), composites or any other combinations of materials. Moreover, the frame 120, the handle mounts 122 and the handle 124 may take any form. For example, in some implementations, the frame 120 may be formed into one or more grids or lattices with one or more bars that are welded, fused, adhered, bolted, screwed, molded, stitched or otherwise joined in a substantially perpendicular alignment with respect to one another, such as is shown in FIGS. 1A, 1B and 1C. Alternatively, in other implementations, the frame 120 may include sides having one or more substantially solid shapes or faces, e.g., without holes or other perforations therein. In still other implementations, however, the frame 120 may be provided with slots or holes, in a regular or irregular lattice or other arrangement (e.g., a honeycombed arrangement or framework).

The handle mounts 122 and the handle 124 may be mounted to the frame 120 in any manner. For example, in some implementations, the handle mounts 122 may extend from one or more aspects of the frame 120, and provide support for the handle 124, which may comprise bars or like components that are mounted to the frame 120 in a transverse manner, e.g., by extending between each of the handle mounts 122 behind the portions of the frame 120 supporting the arms 110, such as is shown in FIGS. 1A through 1E. Alternatively, in other implementations, the handle 124 may comprise two or more parts, including two or more bars or like components that are mounted to the frame 120 substantially horizontally or in a bent or rounded manner.

As is also shown in FIGS. 1A through 1E, the cart 100 further includes other structural components that are mounted to the frame 120, including but not limited to a top cover 130, a pair of angled shields 132, a pair of guards 134, a central shield 135, a pair of front wheel casters 136 and a pair of rear wheel casters 138. The top cover 130 is mounted to the sides of the frame 120 and acts as an overlying roof or structure above some or all of the components of the cart 100. The top cover 130 may take any shape or form, and be formed from any suitable materials (e.g., plastics, woods, metals, composites). For example, in some implementations, the top cover 130 may be formed with a substantially rounded stop surface, as is shown in FIGS. 1A through 1E. Alternatively, in some other implementations, the top cover 130 may include a flat surface that enables one or more items to be temporarily placed thereon, e.g., for item comparison or identification purposes. As is shown in FIG. 1A, the top cover 130 may cover or be mounted or suspended above all or portions of the frame 120, such as one or more of the bags 140 suspended from the arms 110, including all or portions of bags 140 that are disposed the arms 110 in a closed manner, and all or portions of bags 140 that are disposed on the arms 110 in an open manner.

The angled shields 132 may provide shielding or protection for one or more aspects of the cart 100 in a lateral manner. In some implementations, when the cart 100 is moved in a forward direction, the angled shields 132 may provide protection against damage from collisions or other contact to the frame 120 or to one or more of the bags 140, or to any other aspects of the cart 100. The angled shields 132 may take any shape or form with respect to the frame 120 and/or the top cover 130, and may be formed from any suitable materials (e.g., plastics, woods, metals, composites). For example, in some implementations, the top cover 130 may be rounded to correspond to the shapes of the frame 120 or the top cover 130, and may act as a fairing or other like feature in defining an external shape of the cart 100. In some other implementations, the angled shields 132 provide such shielding or protection for one or more closed or open bags 140 suspended from the arms 110 mounted to the frame 120.

The guards 134 may provide a physical protective barrier or obstruction between the bags 140 suspended by the respective arms 110 and the front wheel casters 136 or the rear wheel casters 138, or a surface upon which the cart 100 travels. For example, in some implementations, the guards 134 extend along sides of the frame 120 and are mounted to the frame 120 in a manner that causes the guards 134 to act as a barrier between any dirt, grime, debris or other fouling matter provided on the surface upon which the cart 100 travels, and the undersides of the respective bags 140 suspended above, thereby preventing or inhibiting any friction-based contact between the bags 140 and one or more of the surface, the front wheel casters 136 or the rear wheel casters 138. The guards 134 may be provided at any elevation or angle with respect to the frame 120 and/or the front wheel casters 136 or the rear wheel casters 138. As is shown in FIG. 1C, portions of the guards 134 associated with or mounted to the rear wheel casters 138 are provided at a higher elevation than portions of the guards 134 associated with or mounted to the front wheel casters 136.

The central shield 135 may be aligned in a front portion of the cart 100 and configured to provide shielding or protection for one or more aspects of the cart 100 in a linear manner. In some implementations, when the cart 100 is moved in a forward direction, the central shield 135 may provide the cart 100 with protection against damage from collisions or other direct contact to the frame 120 or one or more other aspects of the cart 100. Like the angled shields 132, the central shield 135 may take any shape or form (e.g., substantially planar or rounded) with respect to the frame 120, and may be formed from any suitable materials.

The front wheel casters 136 and the rear wheel casters 138 include one or more wheels, axles, forks, joints or other components which enable the cart 100 to travel on various surfaces. For example, in some implementations each of the front wheel casters 136 and the rear wheel casters 138 may include a single wheel provided on an axle within a fork, or two or more wheels provided on such an axle. In some other implementations, the front wheel casters 136 and the rear wheel casters 138 may include two or more axles. Alternatively, in still other implementations, a single caster may be provided in lieu of the multiple front wheel casters 136 and the rear wheel casters 138 shown in FIGS. 1A through 1E. In accordance with the present disclosure, the front wheel casters 136 and the rear wheel casters 138 may operate in any manner, as well. For example, in some implementations, one or more of the front wheel casters 136 or the rear wheel casters 138 may be configured to pivot or swivel, and thus automatically adjust or align with a direction of travel. In some other implementations, one or more of the front wheel casters 136 or the rear wheel casters 138 may be fixed, or restricted from pivoting or swiveling to a predetermined extent, such that the wheels of such casters are caused to roll along a straight path. Those of ordinary skill in the pertinent arts will recognize that the cart 100 may be provided with both fixed casters, and with pivotable or swivelable casters, in accordance with the present disclosure.

Those of ordinary skill in the pertinent arts will further recognize that the cart 100 may be equipped with other apparatuses for enabling the cart 100 to travel on solid surfaces, including one or more wheeled components other than casters, including but not limited to omnidirectional wheels, spherical wheels or other like apparatuses. Additionally, in some other implementations, the cart 100 may include two or more skis or other runners for traveling on smooth surfaces. In still other implementations, the cart 100 may be levitated. e.g., by magnetic levitation through the use of one or more linear induction motors. Moreover, the cart 100 may be propelled or pushed by humans or autonomous mobile robots or, alternatively, by one or more motors (e.g., electric-powered or gasoline-powered).

As is also shown in FIGS. 1A through 1E, the cart 100 may be configured to transport or otherwise carry one or more bags 140 on the arms 110 provided thereon. The bags 140 define collapsible or expandable carrying volumes and may include one or more lateral openings (e.g., holes, slots or other features) having corresponding dimensions and shapes in common with one another that enable the bags 140 to receive portions of the arms 110 therethrough. For example, as is shown in FIGS. 1A through 1E, some of the bags 140 may be folded, creased or otherwise compressed, and stored or otherwise disposed on proximal portions of the arms 110 (e.g., the mounting sections 112) in a closed manner. Likewise, one or more bags 140 may be unfolded, uncreased or otherwise expanded and stored or otherwise disposed on distal portions of the arms 110 (e.g., the extensions 114) in an open manner. As is shown in FIGS. 1A through 1E, the lateral openings extend through each of the panels or layers of the bags 140 in a substantially collinear or coaxial manner, regardless of whether the bags 140 are disposed in a closed manner or an open manner. Thus, a user of the cart 100 in a materials handling facility, such as a retail establishment, may identify and obtain an item that he or she desires to buy, rent, or borrow, and deposit the item into an open bag 140 suspended on the arms 110.

As is discussed above, the lateral openings by which the bags 140 are suspended from the arms 110 may have common dimensions and shapes that correspond to the dimensions and shapes of the arms 110. For example, as is shown in FIGS. 1A through 1E, the arms 110 may be mounted to the frame 120 at a predetermined distance from one another, and holes, slots or other features extending through the bags 140 may be separated by the same predetermined distance. Likewise, and as is also shown in FIGS. 1A through 1E, the cross-sections of the arms 110 may have attributes such as shapes, dimensions or areas that substantially correspond to attributes such as shapes, dimensions or areas of the holes, slots or other features of the bags 140. In some implementations, the holes, slots or other features of the bags 140 may have shapes, dimensions or areas that are at least as large as the shapes, dimensions or areas of the cross-sections of the arms 110 on which such bags 140 are to be suspended. In some other implementations, e.g., where the bags 140 are formed from a flexible or elastic material, the holes, slots or other features of the bags 140 may have shapes, dimensions or areas that are smaller than the cross-sections of the arms 110 on which such bags 140 are to be suspended, thereby providing additional friction that may maintain the bags 140 in place on such arms 110 in the absence of physical intervention or contact.

Furthermore, where the bags 140 are formed from one or more panels, such as is shown in FIGS. 1A through 1E, each of which may be formed from a single layer or from two or more layers, the respective panels of the bags 140 may each feature corresponding holes, slots or other features that are substantially coaligned about a common axis, and may be suspended on all or any portion of the arms. In some implementations, a bag 140 may be provided on the mounting sections 112 of a pair of arms 110 in a collapsed format when the bag 140 is not needed for receiving and storing items. When the bag 140 is needed for receiving or storing items, however, the bag 140 may be slid from the mounting sections 112 to the extensions 114, over or across the hinges 116 and/or torsion springs 118, and expanded and stored on the extensions 114, such that a user of the cart 100 may place one or more items into the bag 140. As is shown in FIGS. 1A through 1E, such holes, slots or other features of a bag 140 may be formed such that the holes, slots or other features may remain coaligned about all or a portion of the arms 110 whether the bag 140 is collapsed or expanded.

The bags 140 may be formed from any suitable materials in accordance with the present disclosure. In some implementations, the bags 140 may be formed from one or more panels of fibrous fabrics that are formed at least in part from paper, cotton or recycled plastics, including but not limited to fabrics comprising blends of cotton or like materials and materials comprising recycled plastics, thereby providing the bags 140 with enhanced hydrophobicity to repel liquids or other stain-forming matter. For example, in some implementations, the bags 140 may be formed from non-woven plastic polypropylene materials, while in other implementations, the bags 140 may be formed from woven fabrics including polypropylene or polyethylene fibers. Moreover, the bags 140 may be formed from materials that are laminated on one or both sides thereof, and such materials from which the bags 140 are formed may be selected on any basis. Laminating or otherwise reinforcing or protecting such materials enables the bags 140 to be used, washed and reused on several occasions. For example, where the bags 140 disclosed herein are intended to be reused by customers who received them from a retail establishment, or by the retail establishment that furnished the bags 140 to the customers, such materials may selected based on their durability and capacity to withstand repetitive cleaning and reuse in a variety of environments.

As is discussed above, some implementations of the self-bagging carts disclosed herein include arms that extend laterally from frames and are configured to provide support for one or more bags. Portions of such arms may be folded or retracted when the arms are not needed, thereby causing the carts to occupy a substantially smaller footprint than when such arms are extended, and enabling the carts to be easily stored or nested into one another. Referring to FIGS. 2A through 2D, perspective, side, top and front views of components of one self-bagging cart 200 in accordance with the present disclosure are shown. Except where otherwise noted, reference numerals preceded by the number "2" shown in FIGS. 2A through 2D indicate components or features that are similar to components or features having reference numerals preceded by the number "1" shown in FIGS. 1A through 1E.

As is shown in FIGS. 2A through 2D, the cart 200 includes a pair of arms 210 mounted to a left side and a right side of a frame 220. Each of the arms 210 includes a mounting section 212 and an extension 214, with a plurality of bags 240 suspended from the mounting section 212 of each of the sets of arms 210. The cart 200 further includes a handle 224 mounted to the frame 220 by a pair of handle mounts 222. The cart 200 also includes a top cover 230, a pair of angled shields 232, a pair of guards 234, a pair of front wheel casters 236 and a pair of rear wheel casters 238.

Figure 2A:
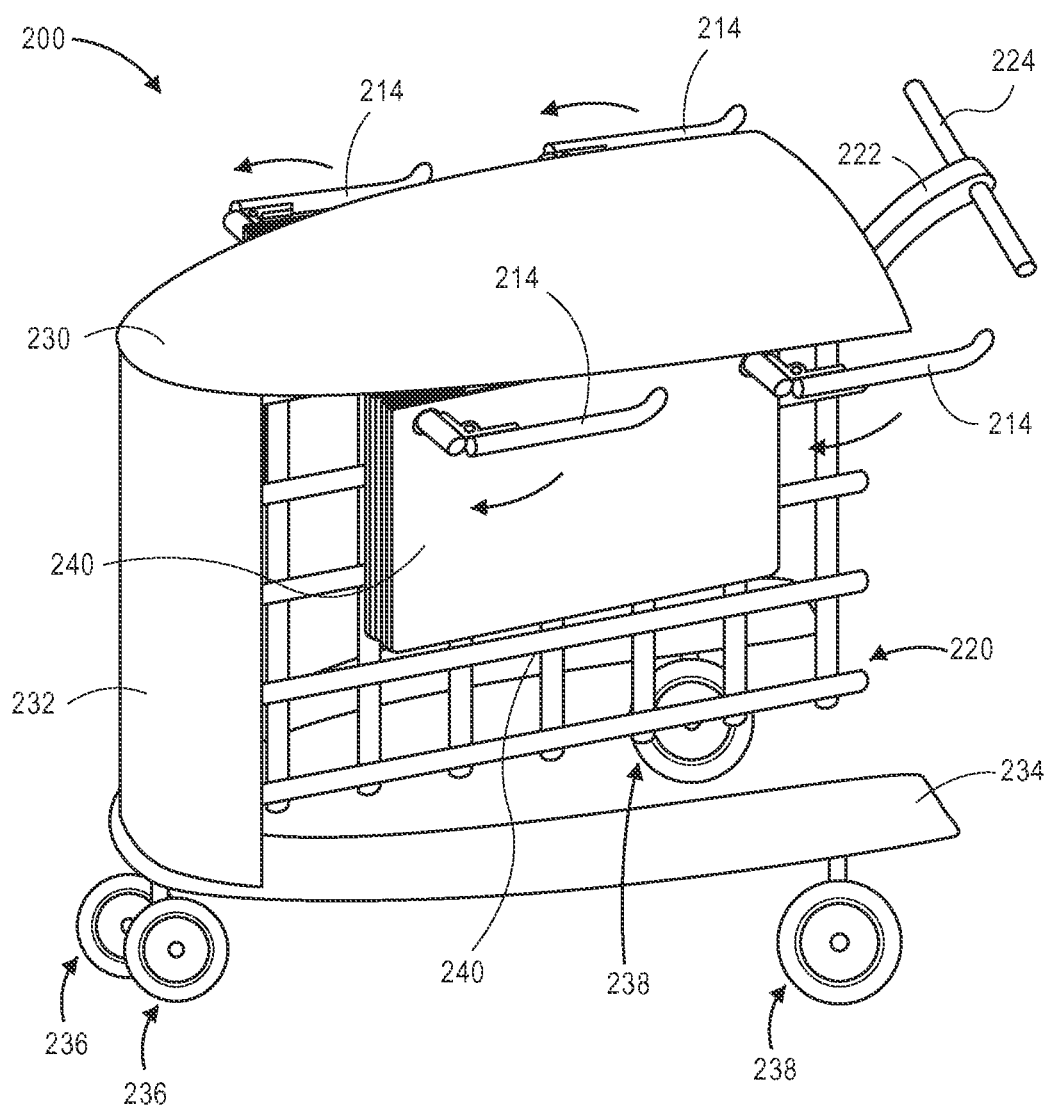
FIGS. 2A through 2D are views of components of one self-bagging cart in accordance with implementations of the present disclosure.
Figure 2B:
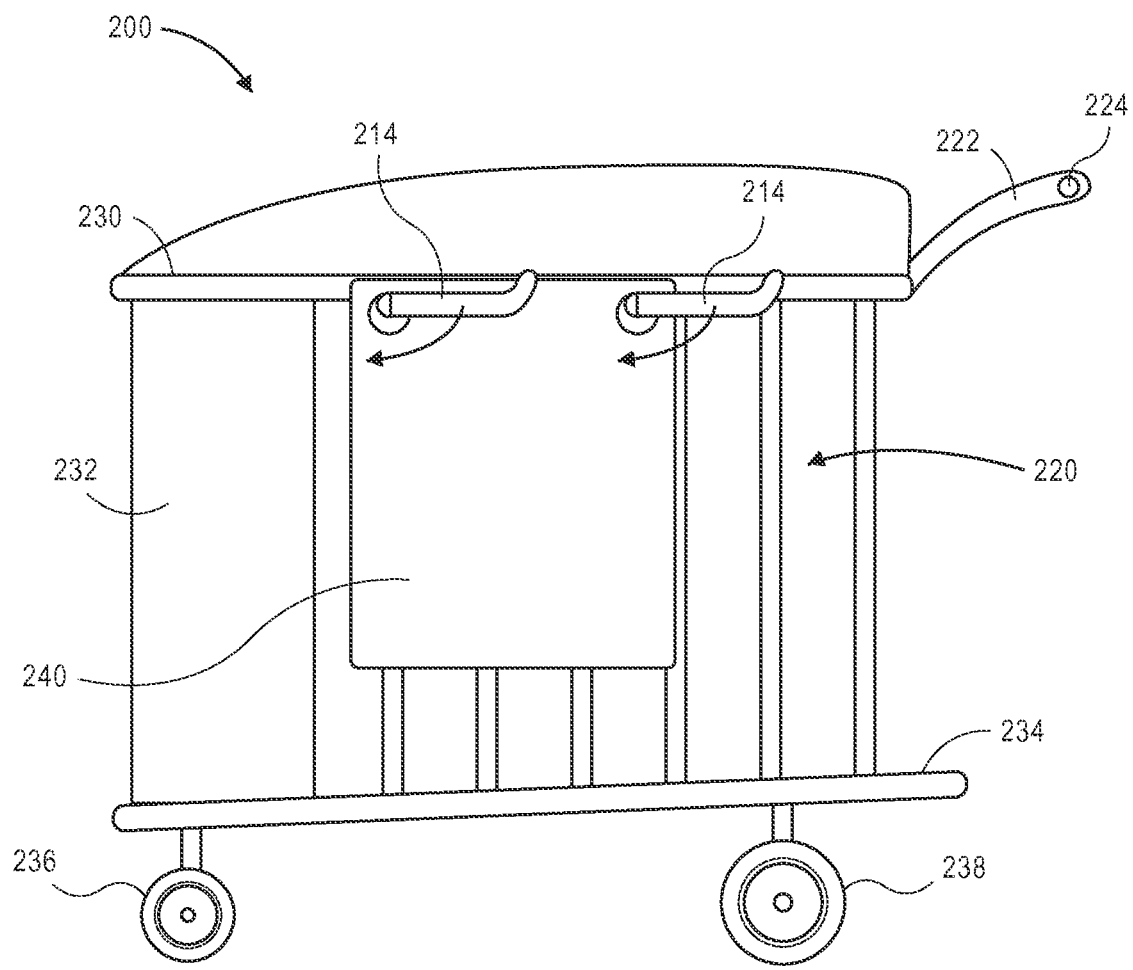
Figure 2C:
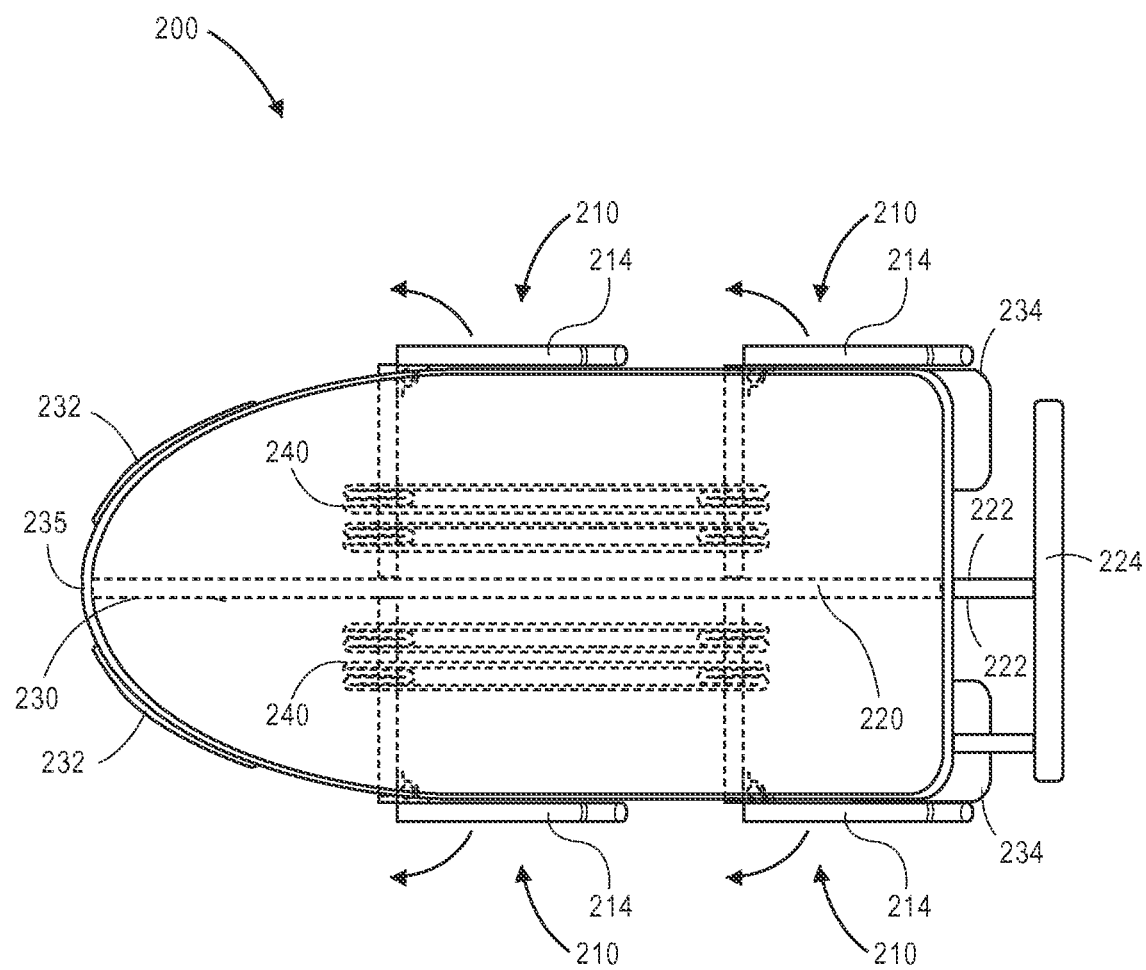
Figure 2D:
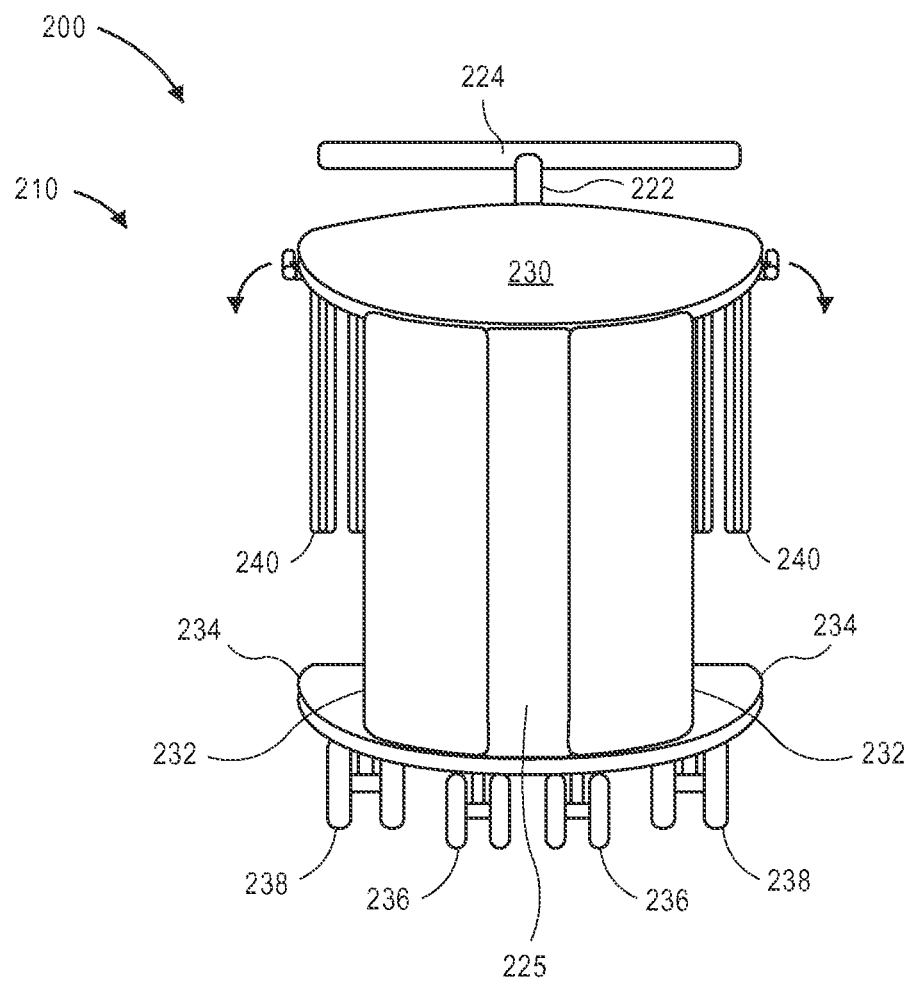

As is discussed above, some of the arms that are provided on self-bagging carts of the present disclosure for suspending bags thereon include extensions that may be folded adjacent to or alongside of the carts when such extensions are not needed. Thus, as is shown in FIGS. 2A, 2B and 2C, the extensions 214 of the arms 210 may be folded from a first position extending laterally from the frame 220 into a second position alongside of the frame 220 when the cart 200 is not being used to retrieve and store items, i.e., when the cart 200 does not have one or more bags suspended from such arms 210. Additionally, as is shown in FIGS. 2A through 2D each of the extensions 214 includes a raised or rounded tip at a distal end thereof which acts as a mechanical stop to aid in maintaining bags 240 thereon when the extensions 214 are folded in the first position. The tips of the extensions 214 are at a higher elevation than other portions of the extensions 214, namely, the proximal end of the extensions 214 that are joined to the mounting sections 212 via the hinges 216. Although the tips of the extensions 214 are shown in FIGS. 2A through 2D as being rounded, those of ordinary skill in the pertinent arts will recognize that tips or portions of the extensions 214 may be shaped in any manner that may urge bags 240 to remain on the extensions 214 without further action by a human operator or automated agent.

In this regard, when the extensions 214 are folded alongside the cart 200 into the second position, such as is shown in FIGS. 2A, 2B and 2C, the cart 200 occupies a substantially smaller footprint of floor space than when the extensions 214 are fully extended into the first position, e.g., such as is shown with regard to the cart 100 of FIGS. 1A through 1E, and may be more easily stowed either on an individual basis or along with one or more other carts 200, e.g., in one or more predefined corrals or other areas. Those of ordinary skill in the pertinent arts will recognize that the arms 210 may include any type or form of biasing element for causing the extensions to be biased or urged in the first position or in the second position. Those of ordinary skill in the pertinent arts will further recognize that the extensions 214 may be rotated with respect to the mounting sections 212 of the arms 210 in any manner, e.g., about an axis defined by hinge connecting the mounting sections 212 to the extensions 214.

Additionally, as is shown in FIGS. 2A through 2D, the arms 210 provided on the cart 200 are configured to store one or more bags 240 thereon, even when the extensions 214 are folded against the frame 220. For example, when the extensions 214 are fully extended and aligned coaxially with the mounting sections 212, a plurality of bags 240 may be loaded onto the arms 210 via the extensions 214 and stored on the mounting sections 212. Subsequently, the extensions 214 may be folded alongside the frame 220, thereby enabling the cart 200 to be stowed with bags 240 provided thereon, and ready to receive and store items by the next user who places the cart 200 into operation.

Moreover, those of ordinary skill in the pertinent arts will recognize that the dimensions of the various components of the self-bagging carts disclosed herein, including but not limited to the lengths or widths of the mounting sections 212, the extensions 214 or the arms 210 as a whole, may be selected such that the arms 210 are concealed beneath the top cover 230 when the extensions 214 are folded into the frame 220, thereby minimizing the footprint occupied by the cart 200 when the cart 200 is not in service.

In some implementations of the present disclosure, the self-bagging carts may be configured to nest or otherwise functionally join with one another. Some of the self-bagging carts disclosed herein may include frames or other elements that may be temporarily or permanently configured to receive portions of other self-bagging carts, e.g., in series. For example, some implementations of the self-bagging carts may feature frames that may unfold or extend from a closed alignment, or a normal operating alignment, in which bags may be suspended from one or more arms extending therefrom and filled with items by users, and an open alignment, or a nesting alignment, in which the frames are unfolded to accommodate a portion of another self-bagging cart therein.

Figure 3A:
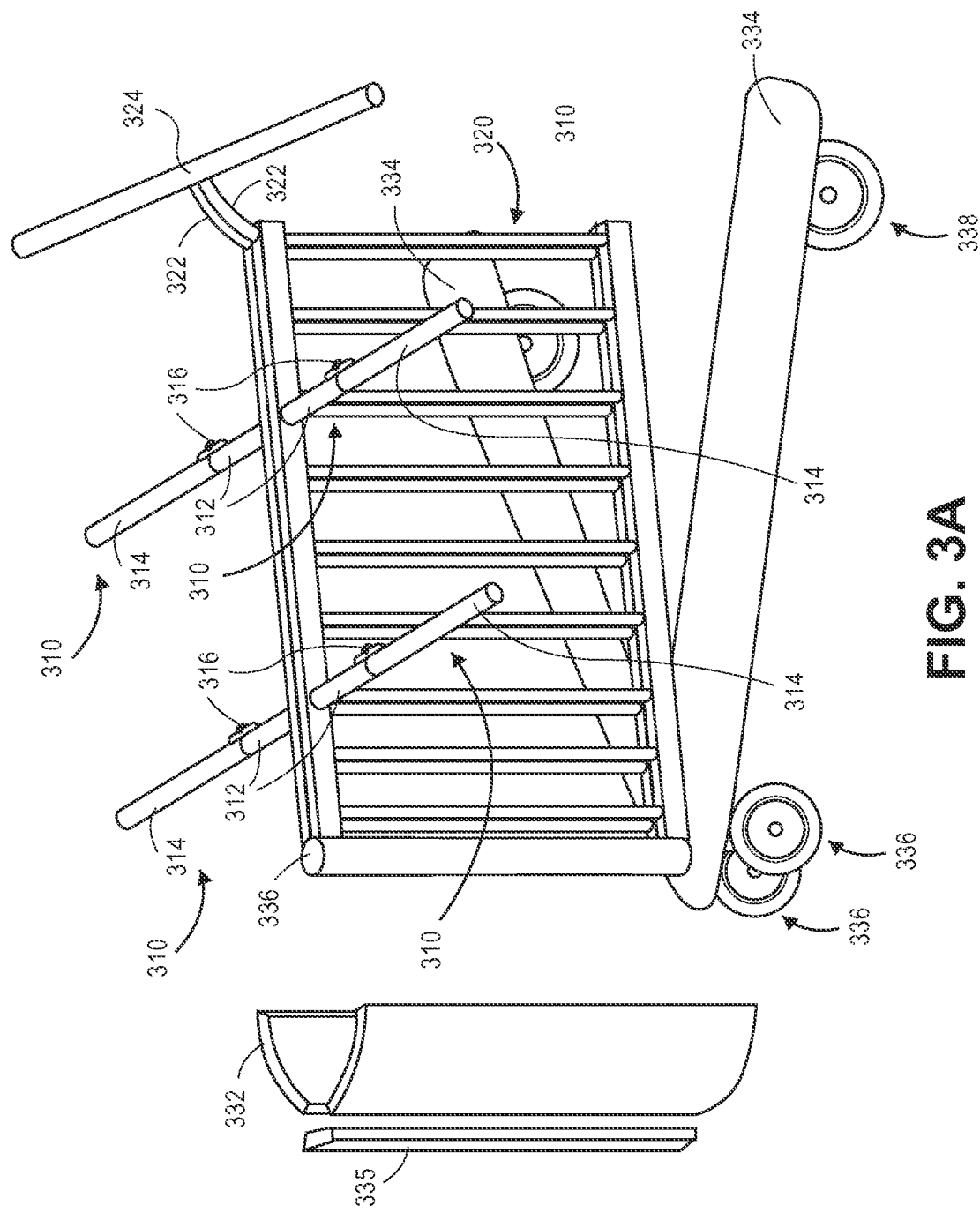
FIG. 3A and FIG. 3B are views of components of one self-bagging cart in accordance with implementations of the present disclosure.
Figure 3B:
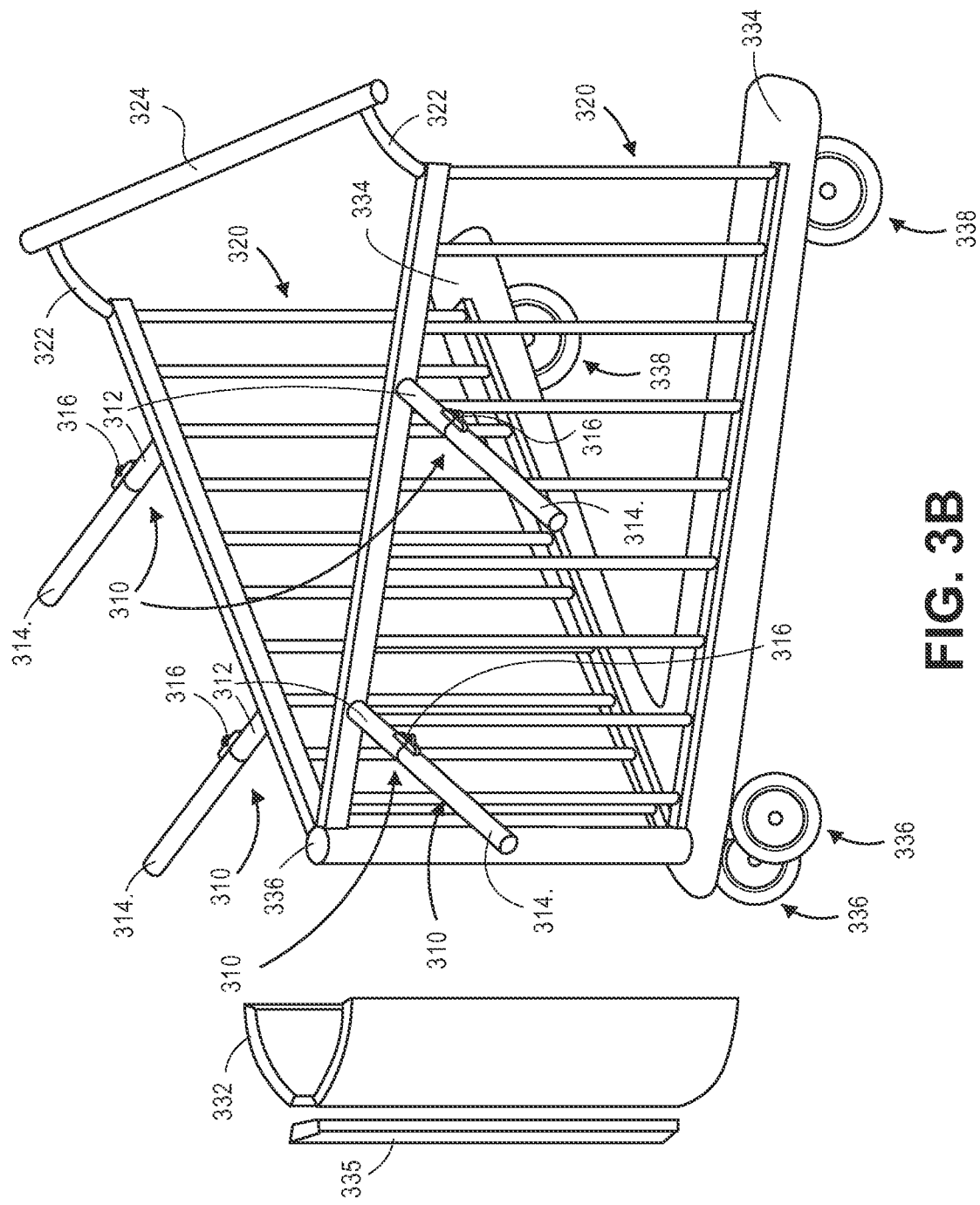

Referring to FIGS. 3A and 3B, exploded perspective views of components of one self-bagging cart 300 in accordance with the present disclosure are shown. Except where otherwise noted, reference numerals preceded by the number "3" shown in FIG. 3A or FIG. 3B indicate components or features that are similar to components or features having reference numerals preceded by the number "2" shown in FIGS. 2A through 2D or by the number "1" shown in FIGS. 1A through 1E.

As is shown in FIGS. 3A and 3B, the cart 300 includes sets of arms 310 mounted to and extending outwardly from each of a pair of frame members 320 thereon. Each of the arms 310 includes a proximal end or mounting section 312 and a distal end or extension 314 that are joined by a hinge 316. The frame members 320 are joined to one another about a hinge 326, about which the frame members 320 may rotate or pivot with respect to one another. Each of the frame members 320 comprises a grid or lattice-like structure having bars or framing elements which provide structural support to various aspects of the cart 300, and includes a pair of handle mounts 322 mounted to rear portions of the frame members 320, and a handle 324 supported by the handle mounts 322. Additionally, the cart 300 further includes a top cover 330 mounted to upper portions of the frame members 320, and a pair of guards 334, a front shield 335, a pair of front wheel casters 336 and a pair of rear wheel casters 338 are mounted to a lower portion of the frame members 320.

In the closed alignment of FIG. 3A, the cart 300 is shown with the frame members 320 closed about the hinge 326 and aligned substantially along axially with or parallel to a direction of travel of the cart 300. The arms 310 extending substantially perpendicularly therefrom and are configured to receive one or more collapsed bags or expanded bags, e.g., one or more of the bags 140 of FIGS. 1A through 1E or the bags 240 of FIGS. 2A through 2D thereon. When the cart 300 is in the closed alignment, e.g., a normal operating alignment, shown in FIG. 3A, the top cover 330 is aligned to extend over and cover one or more bags (not shown) that may be suspended from the arms 310, including all or portions of bags that are disposed on the mounting sections 312 of the arms 310 in a closed manner, and at least some of the portions of bags 340 that are disposed on distal ends or extensions 314 of the arms 310 in an open manner.

In the open alignment of FIG. 3B, the cart 300 of FIG. 3A may be configured to receive portions of similar carts (not shown) in series, or to be inserted into a portion of a similar cart (not shown), by unfolding or opening the frame members 320 into an open alignment, or a nesting alignment. As is shown in FIG. 3B, the frame members 320 of the cart 300 are opened about the hinge 326 from the closed alignment or the normal operating alignment of FIG. 3A and are provided in an open shape of a letter V, thereby forming or establishing an interior cavity within the frame members 320. Thus, in the alignment of FIG. 3B, the cart 300 may receive a front end of a second cart (not shown) within an opening of the interior cavity formed or established by the frame members 320, and may itself be inserted into an opening of a similar interior cavity of a third cart having frame members in the open alignment or in the nesting alignment. The open shape (e.g., the V-shape) of the cart 300 in the alignment of FIG. 3B thus enables the cart 300, and one or more other identical or similar carts to be stored or transported in series with one another.

Figure 4A:
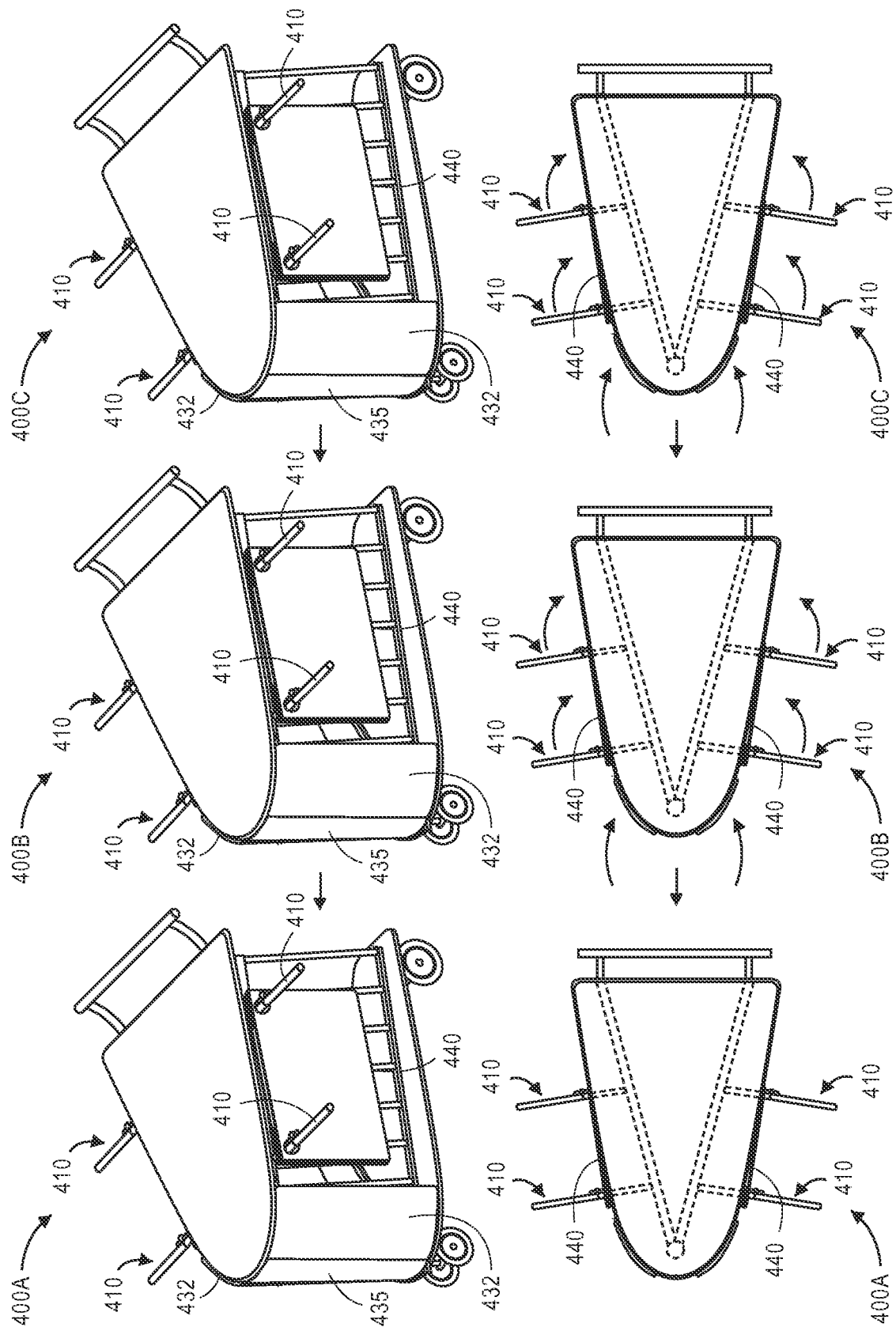
FIGS. 4A through 4C are views of components of self-bagging carts in accordance with implementations of the present disclosure.
Figure 4B:
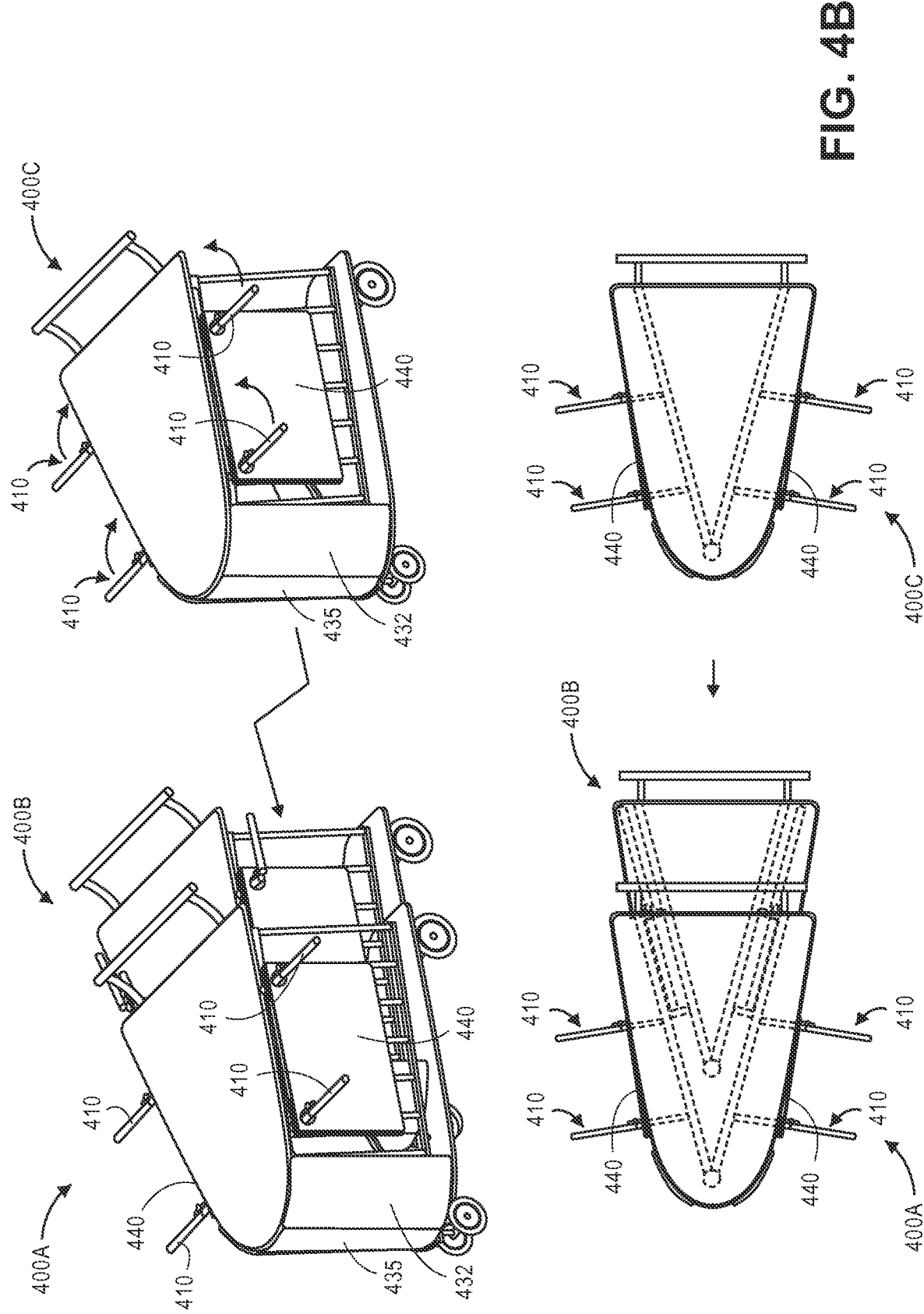
Figure 4C:
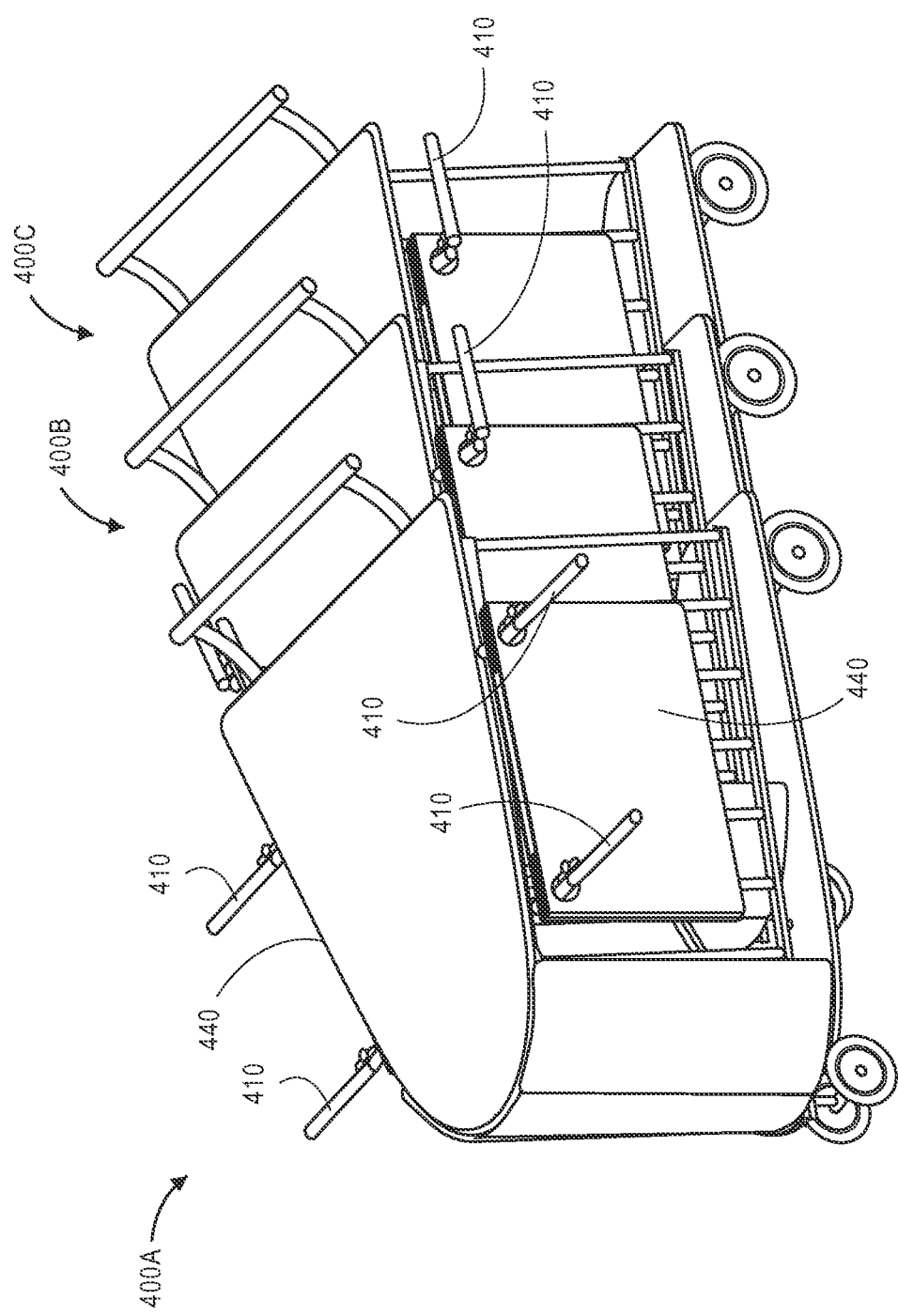

The shapes, dimensions or features of the self-bagging carts of the present disclosure may be selected such that a frame of a cart, or the cart as a whole, forms or establishes an interior cavity, e.g., within the frame members 320 of the cart 300 of FIG. 3A and FIG. 3B, having an opening that substantially corresponds to all or a portion of an external shape of the cart. When a cart features an interior cavity having an opening that corresponds to its external shape, in whole or in part, two or more of the carts may be nested into one another in series, with a forward portion of one cart being received within a rear portion of another cart. Referring to FIGS. 4A through 4C, views of components of self-bagging carts 400A, 400B, 400C in accordance with the present disclosure are shown. Except where otherwise noted, reference numerals preceded by the number "4" shown in FIGS. 4A through 4C indicate components or features that are similar to components or features having reference numerals preceded by the number "3" shown in FIG. 3A or 3B, by the number "2" shown in FIG. 2A through 2D or by the number "1" shown in FIGS. 1A through 1E.

As is shown in FIG. 4A, each of the carts 400A, 400B, 400C is aligned in a common row and includes two sets of arms 410 extending laterally therefrom, e.g., one pair on each side of each of the carts 400A, 400B, 400C, with one or more bags 440 or other item carriers suspended from the sets of arms 410. As is also shown in FIG. 4A, portions of each of the arms 410 are configured to fold or otherwise rotate into alignment with a left side or a right side of the respective cart 400A, 400B, 400C, e.g., about a hinge provided thereon.

As is shown in FIG. 4B, the arms 410 of the cart 400B are folded or rotated alongside the cart 400B, thereby causing the cart 400B to define an external shape that substantially conforms to an interior shape of the cart 400A. Thus, when the arms 400 of the cart 400B are so folded or rotated, a forward portion of the cart 400B may be pushed or otherwise inserted into a rear portion of the cart 400A, and the carts 400A, 400B may be transported or stowed in series.

Likewise, as is also shown in FIG. 4B, portions of the arms 410 of the cart 400C may also be folded or rotated alongside the cart 400C. When the arms 410 of the cart 400C are so folded or rotated, a forward portion of the cart 400C may also be pushed or otherwise inserted into a rear portion of the cart 400B. As is shown in FIG. 4C, when the forward portion of the cart 400C is inserted into the rear portion of the cart 400B, the carts 400A, 400B. 400C may be transported or stowed in series.

Those of ordinary skill in the pertinent arts will recognize that any number of self-bagging carts having exterior shapes corresponding to interior shapes thereof, e.g., with one or more arms or extensions thereof folded or retracted therein, may be inserted into one another and transported or stowed in series. Once the carts are functionally linked with one another in this manner, the carts may be collectively transported or stowed in any manner, such as is shown in FIG. 4C, e.g., manually or through the use of one or more powered apparatuses (e.g., cart pushers, cart pullers or cart retrievers) in accordance with the present disclosure.

As is further discussed above, some implementations of the self-bagging carts of the present disclosure may be adapted to store excess collapsed or folded bags or other item carriers along with expanded or unfolded bags of such item carriers that are configured to receive or store items therein. For example, collapsed bags may be suspended from a pair of arms, e.g., on or near proximal ends of such arms, until such bags are needed, while expanded bags may be suspended from the pair of arms, e.g., on or near distal ends of such arms, and configured to receive items selected by users of the cart. Referring to FIGS. 5A through 5E, views of components of one self-bagging cart 500 in accordance with implementations of the present disclosure are shown. Except where otherwise noted, reference numerals preceded by the number "5" shown in FIGS. 5A through 5E indicate components or features that are similar to components or features having reference numerals preceded by the number "4" shown in FIGS. 4A through 4C, by the number "3" shown in FIGS. 3A and 3B, by the number "2" shown in FIGS. 2A through 2D or by the number "1" shown in FIGS. 1A through 1E.

Figure 5A:
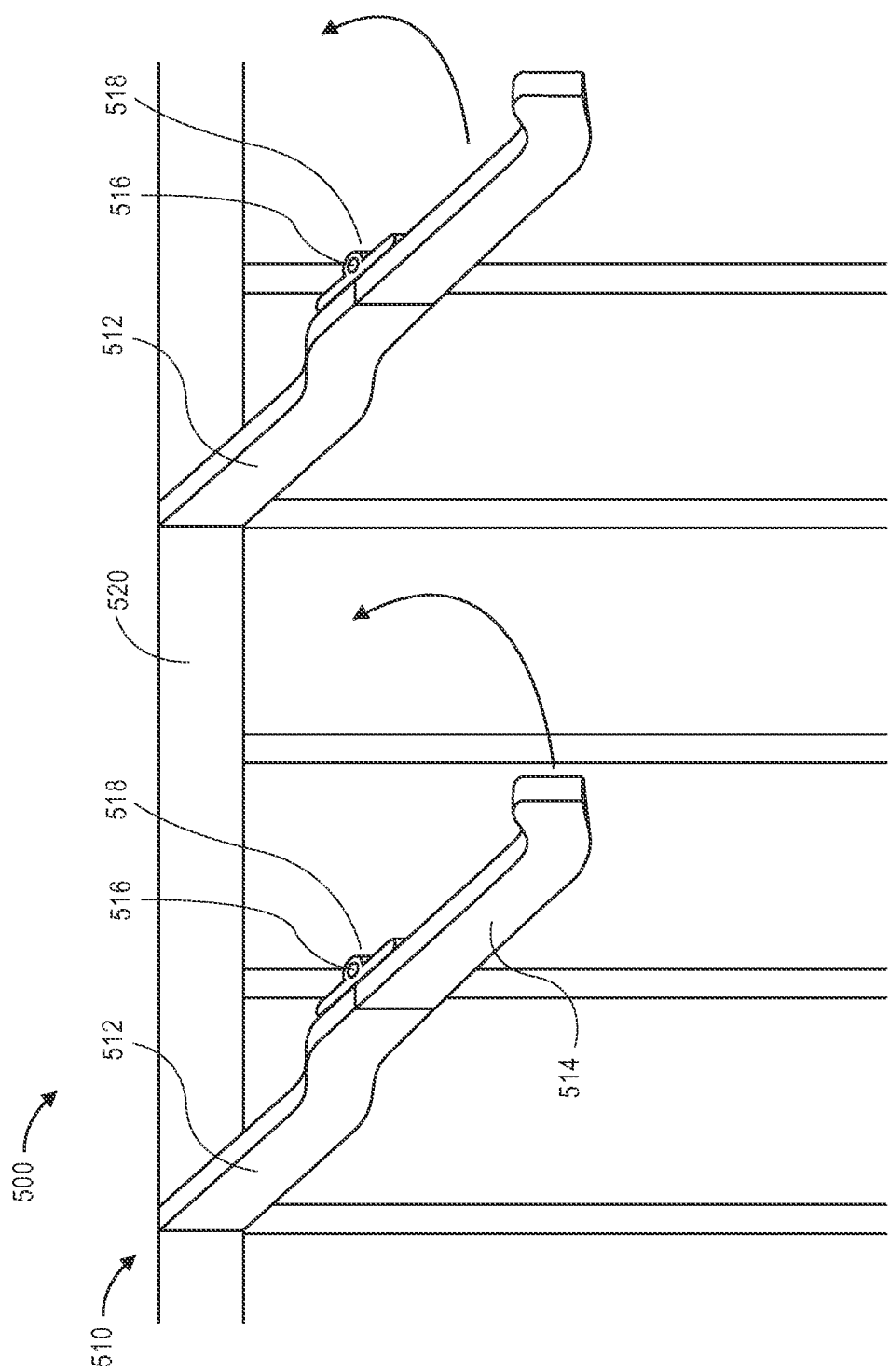

As is shown in FIG. 5A, the cart 500 includes a pair of arms 510 mounted to a frame 520. Each of the arms 510 includes a proximal mounting section 512 for mounting the arm 510 to the frame 520 and a distal extension 514, with the mounting section 512 and the extension 514 joined by a hinge 516. The extension 514 is configured to rotate about the hinge 516 from a fully extended position shown in FIG. 5A to a folded position substantially parallel to the portion of the frame 520 to which the arm 510 is mounted. A biasing element 518, e.g., a spring or other like element, is provided to urge the extension 514 into the fully extended position shown in FIG. 5A until a sufficient force or moment is applied to the extension 514, to overcome the biasing force provided by the biasing element 518 and cause the extension 514 to rotate inward toward the frame 520.

As is also shown in FIG. 5A, the mounting sections 512 and the extensions 514 of the arms 510 each include substantially rectangular cross-sections of varying sizes, and are separated by a predetermined distance. The mounting sections 512 each include a first region in a vicinity of the frame 520 and a second region having a cross-section that is substantially larger than a cross-section of the first region where the mounting section 512 is joined with the extension 514 via the hinge 516, as well as a sloped transition region extending between the first region and the second region. Likewise, the extension 514 includes a third region having a cross-section that substantially corresponds to the cross-section of the second region of the mounting section 512 in size, area and orientation, and a fourth region having an increasingly substantially larger cross-section at the distal end of the extension 514.

Figure 5B:
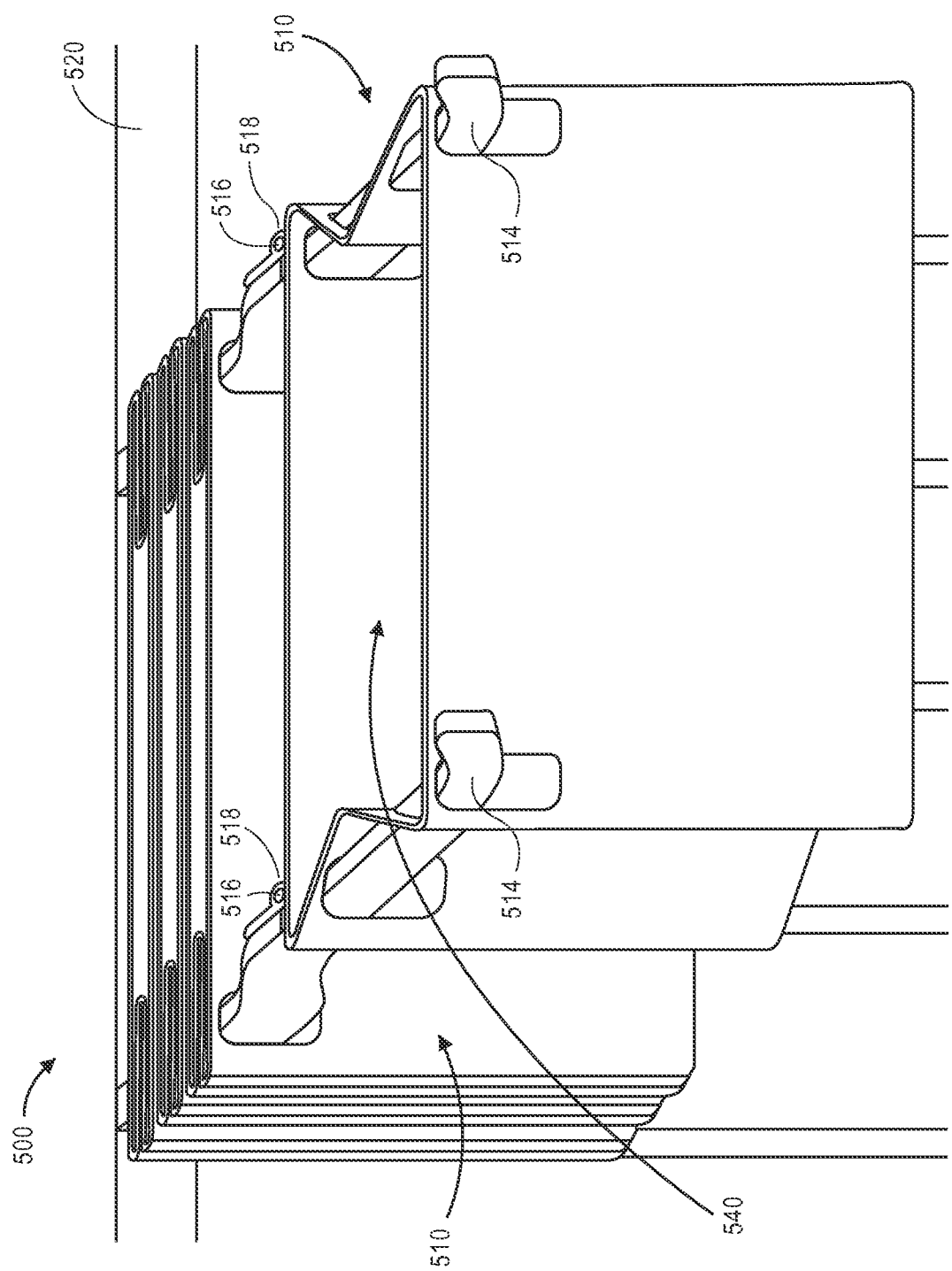
Figure 5E:
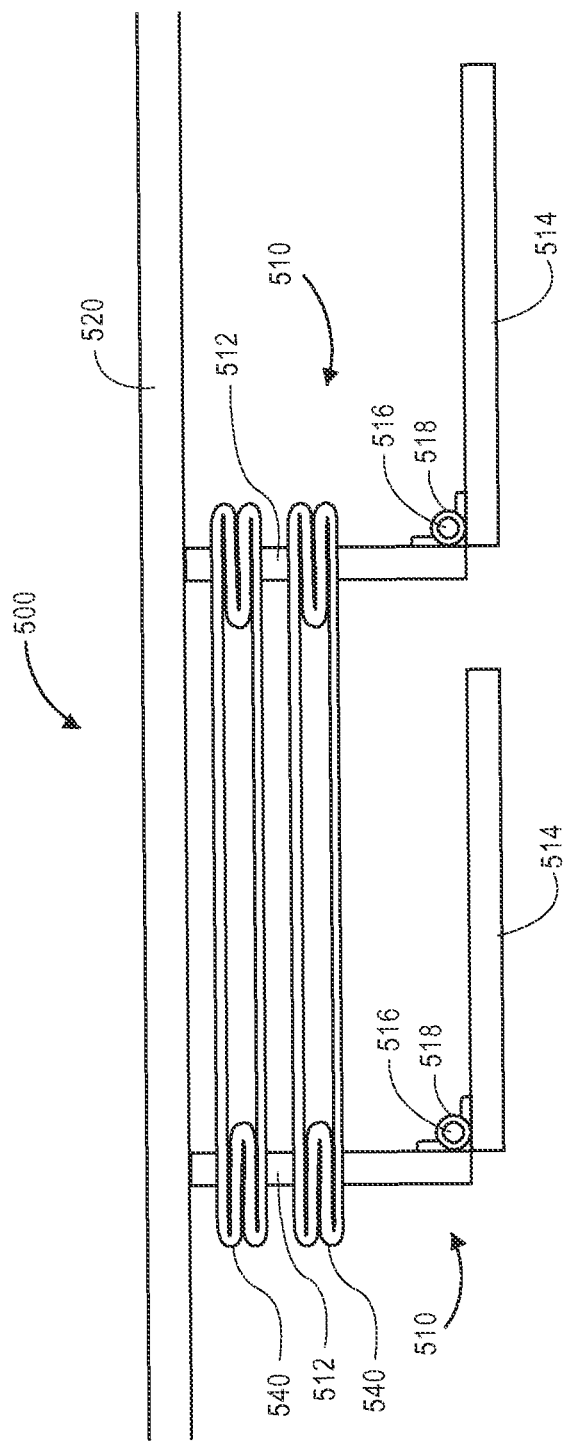

Thus, as is shown in FIG. 5B, where two or more arms 510 are separated by a predetermined distance, one or more bags 540 defining flexible carrying volumes having holes, slots or other like features that are also separated by the same predetermined distance may be placed onto such arms 510. For example, where a plurality of bags 540 is placed onto the arms 510, one or more bags 540 may be stored in a compressed or folded manner on the mounting sections 512, and one bag 540 may be optionally stored in an expanded or unfolded manner on the extensions 514, such that a user of the cart 500 may readily place one or more items of interest into the expanded or unfolded bag 540.

Those of ordinary skill in the pertinent arts will recognize that when one or more bags 540 are suspended from the mounting sections 512 of the arms 510, the transition regions and/or the second regions of the mounting sections 512 tend to urge such bags 540 onto the first regions within a vicinity of the frame 520, e.g., via gravity. Such bags 540 may remain in place until one of the bags 540 is manually slid from the mounting sections 512 to the extensions 514, over or across the hinges 516 and/or biasing element 518. Similarly, those of ordinary skill in the pertinent arts will further recognize that when a bag is suspended from the extensions 514 of the arms 510, the increasingly larger cross-section of the fourth regions of the extensions 514 tend to urge an expanded bag 540 suspended on the extensions 514 to remain in place thereon until the expanded bag 540 is manually removed therefrom.

When one or more items has been placed into an expanded bag 540 suspended from the extensions 514 of the arms 510, and the expanded bag 540 is removed therefrom, the extensions 514 may be folded or rotated inward toward the frame, e.g., about the hinge 516, when a sufficiently large force or moment is provided to overcome the biasing force provided by the biasing element 518. As is shown in FIG. 5C, the extensions 514 may be folded or otherwise rotated inwardly, with one or more collapsed bags 540 remaining in place on the mounting sections 512.

Figure 6A:
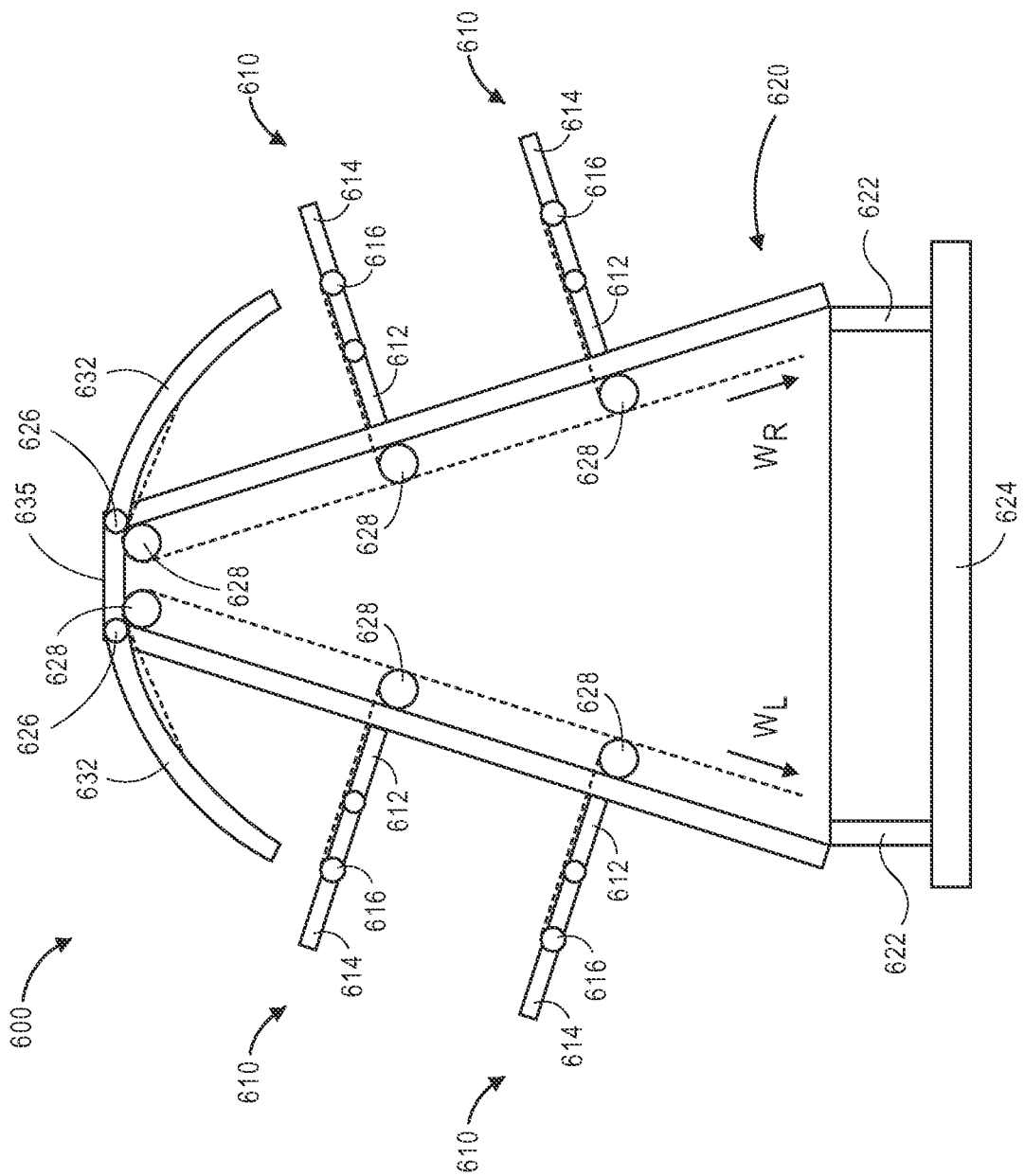
FIGS. 6A and 6B are views of components of one self-bagging cart in accordance with implementations of the present disclosure.
Figure 6B:
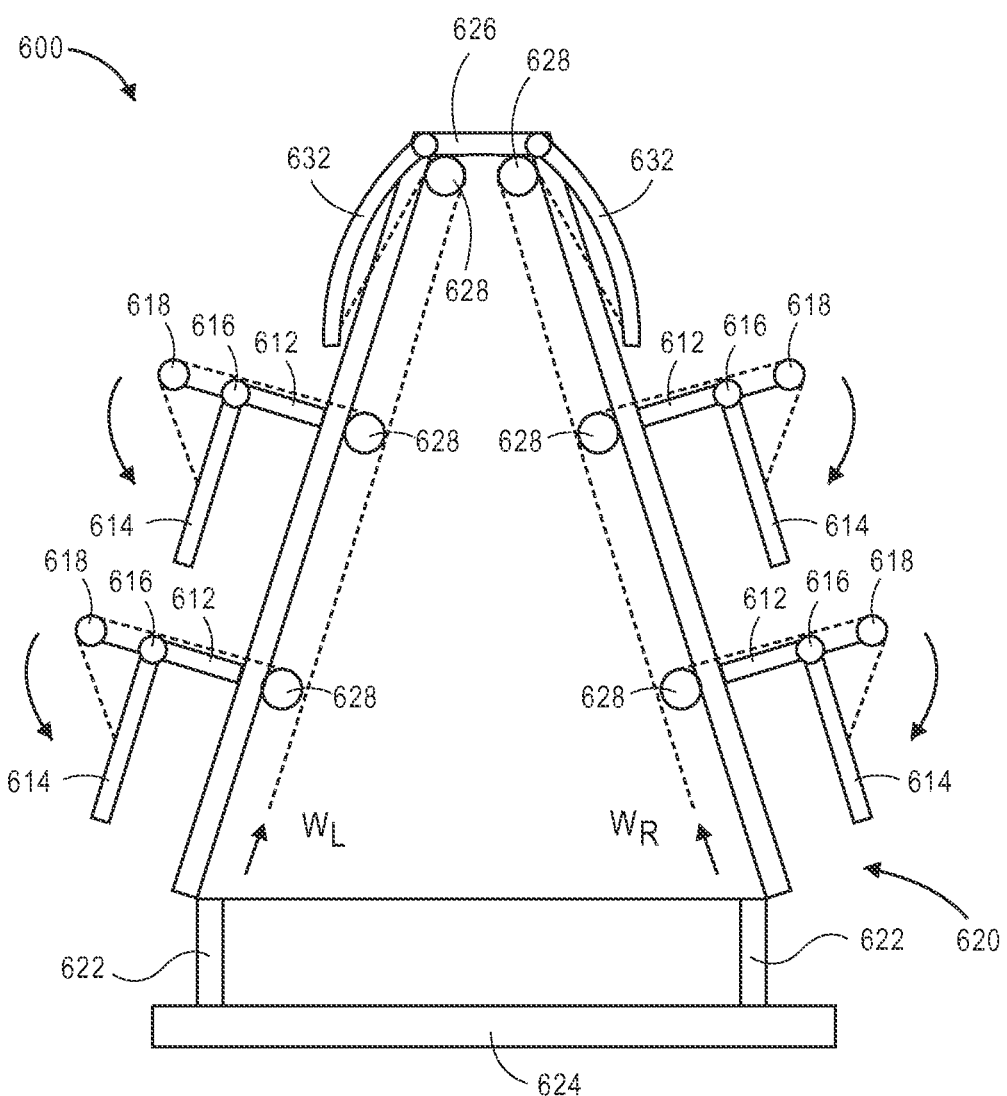

As is further discussed above, the arms provided on some implementations of the self-bagging carts of the present disclosure may biased or urged into open or extended positions, or into closed or retracted positions, through the use of any type of biasing elements, such as springs or pulleys. Referring to FIGS. 6A and 6B, views of components of one self-bagging cart 600 in accordance with implementations of the present disclosure are shown. Except where otherwise noted, reference numerals preceded by the number "6" shown in FIGS. 6A and 6B indicate components or features that are similar to components or features having reference numerals preceded by the number "5" shown in FIGS. 5A through 5E, by the number "4" shown in FIGS. 4A through 4C, by the number "3" shown in FIGS. 3A and 3B, by the number "2" shown in FIGS. 2A through 2D or by the number "1" shown in FIGS. 1A through 1E.

As is shown in FIG. 6A and FIG. 6B, the cart 600 includes sets of arms 610 mounted to and extending outward from left and right frame members 620, which are joined at hinged connections 626 and form an interior cavity in an open shape of a letter V between the frame members 620. The arms 610 are aligned and extended to receive one or more bags (not shown) thereon. Each of the arms 610 includes a mounting section 612 mounted to one of the frame members 620 and an extension 614 joined to the mounting section 612 by a hinge 616. A pair of handle mounts 622 are mounted to rear portions of each of the frame members 620, and a pair of angled shields 632 and a front shield 635 are mounted to front portions of the frame members 620.

The angled shields 632 and the extensions 614 of the arms 610 are biased or urged into extended positions with respect to the frame 620, or released from such extended positions, through the use of one or more connectors 625 and pulleys 618, 628. For example, as is shown in FIG. 6A, when the connectors 625 are placed in tension via respective weights $W_L$, $W_R$, such tension causes the angled shields 632 and the extensions 614 to be drawn outward from the respective frame members 620. As is shown in FIG. 6B, however, when the tension provided by the respective weights $W_L$, $W_R$ is released from the connectors 625, or no longer applied to such connectors 625, the angled shields 632 and the extensions 614 are drawn inward toward the frame members 620. In this regard, the positions of both the angled shields 632 and the extensions 614 may be controlled based on the presence or absence of tension in the connectors 625, thereby enabling the size of an area in space occupied by the cart 600 to be manipulated accordingly.

Although the cart 600 including the pulleys 618 and the pulleys 628 is shown in an open alignment, e.g., with the frame members 620 provided in an open shape of a V, those of ordinary skill in the pertinent arts will recognize that one or more pulleys or pulley systems may be used to bias or urge one or more elements of self-bagging carts of the present disclosure regardless of their alignment, orientation or position. For example, referring again to the cart 300 of FIGS. 3A and 3B, one or more pulleys, such as the pulleys 618 or the pulleys 628 of FIGS. 6A and 6B, could be provided to bias or urge the extensions 314 of the arms 310 into an extended position, or in a retracted position, without regard to whether the cart 300 is in the alignment of FIG. 3A, in the alignment of FIG. 3B, or in transition between the alignment of FIG. 3A and the alignment of FIG. 3B.

Figure 7A:
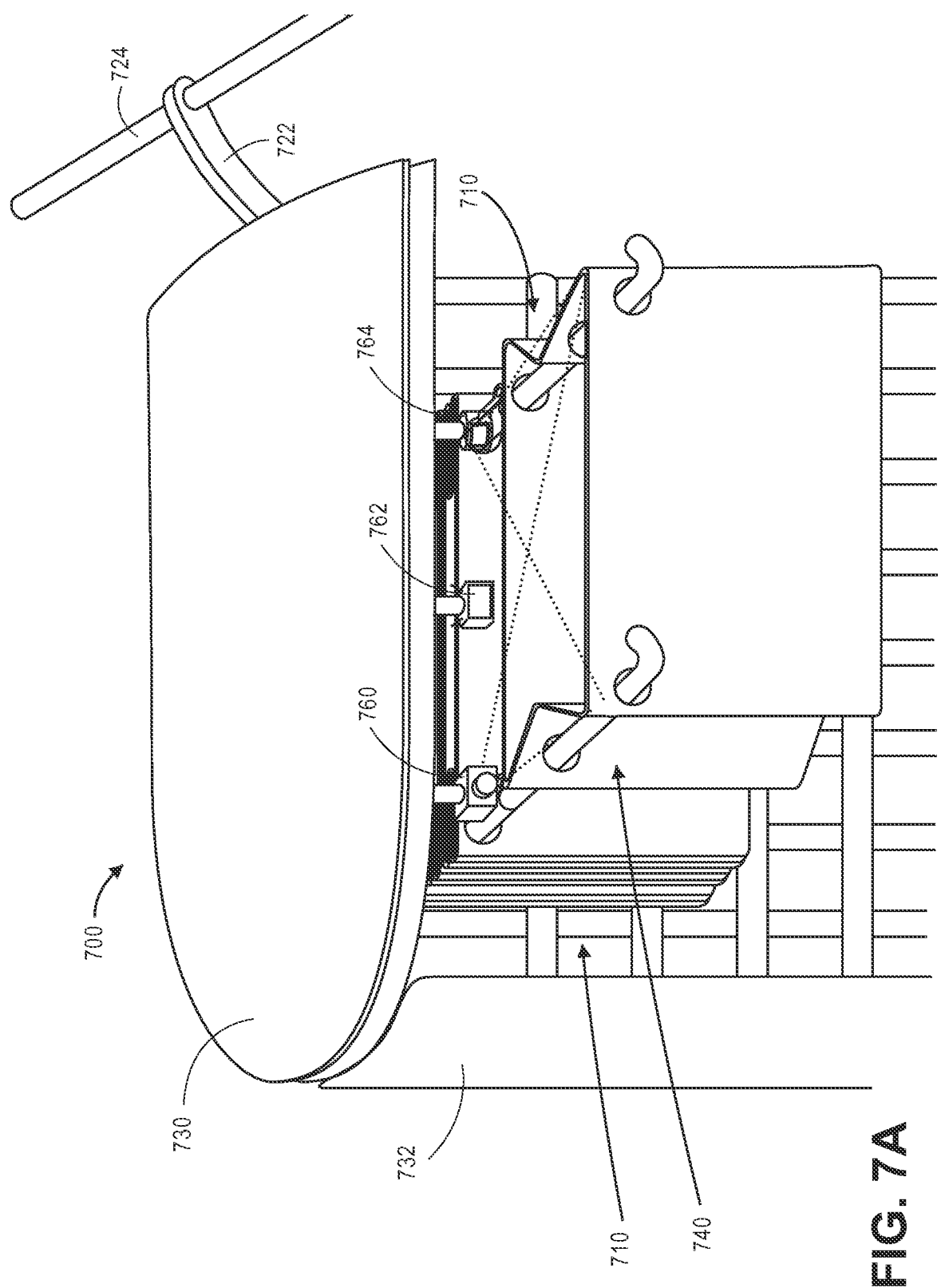
FIGS. 7A and 7B are views of components of one self-bagging cart in accordance with implementations of the present disclosure.
Figure 7B:
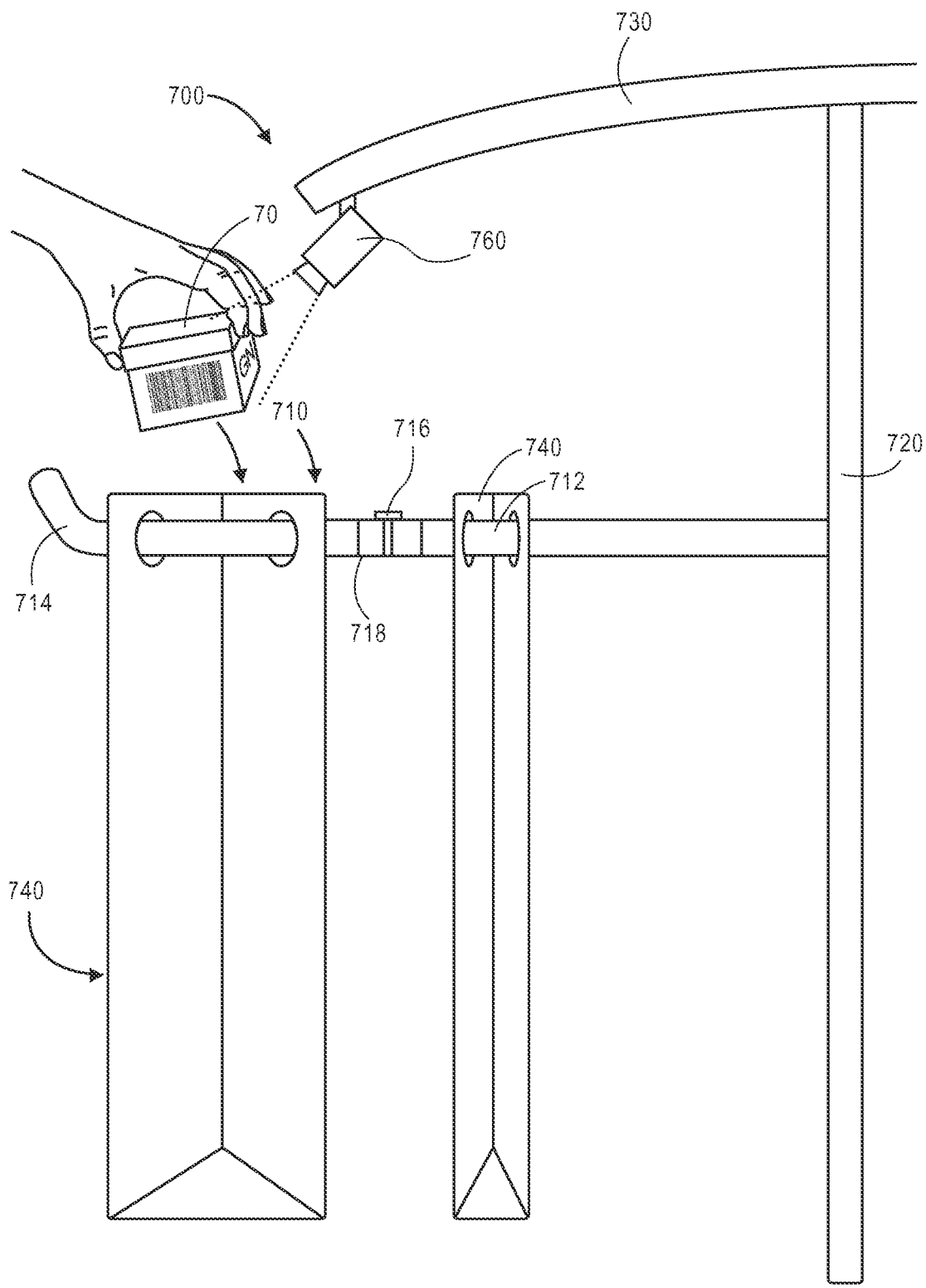

As is also discussed above, some implementations of the self-bagging carts may include various electronic or communications equipment that may monitor the status of such carts, including but not limited to the number or type of items received therein, as a user travels through a materials handling facility while using one or more of the carts. Referring to FIGS. 7A and 7B, views of components of one self-bagging cart 700 in accordance with implementations of the present disclosure are shown. Except where otherwise noted, reference numerals preceded by the number "7" shown in FIGS. 7A and 7B indicate components or features that are similar to components or features having reference numerals preceded by the number "6" shown in FIGS. 6A and 6B, by the number "5" shown in FIGS. 5A through 5E, by the number "4" shown in FIGS. 4A through 4C, by the number "3" shown in FIGS. 3A and 3B, by the number "2" shown in FIGS. 2A through 2D or by the number "1" shown in FIGS. 1A through 1E.

The cart 700 includes a pair of arms 710 mounted to and extending outward from a side of a frame 720. The arms 710 include a plurality of bags 740 defining flexible carrying volumes that may be expanded or collapsed and are suspended therefrom. Each of the arms 710 includes a mounting section 712 mounted to the frame 720 and an extension 714 joined to the mounting section 712 by a hinge 716. A top cover 730 is mounted to an upper portion of the frame 720. A pair of handle mounts 722 are mounted to a rear portion of the frame 720, and an angled shield 732 is mounted to a front portion of the frame 720.

Additionally, the cart 700 further includes an imaging device 760 (e.g., a digital camera or depth sensor), a radio frequency identification ("RFID") reader 762 and a scanner (or reader) 764 mounted to the frame 720 beneath the top cover 730. The imaging device 760, the RFID reader 762 and/or the scanner 764 may be aligned or configured to capture information or data regarding items within a vicinity of the cart 700, including but not limited to items being deposited within an expanded bag 740 provided on the cart 700.

For example, the imaging device 760 may be any type or form of device configured to capture light that is reflected from objects, and by subsequently calculating or assigning one or more quantitative values to aspects of the reflected light, e.g., pixels, generating an output based on such values, and storing such values in one or more data stores. The imaging device 760 may include any number of sensors or components for detecting information regarding aspects of any number of pixels of the reflected light, generating data files including such information, and storing such data files in one or more onboard or accessible data stores (e.g., a hard drive or other like component), as well as one or more removable data stores (e.g., flash memory devices), displaying such data files on one or more broadcast or closed-circuit television networks, or transferring such data files over a computer network as the Internet. The imaging device 760 may further include one or more manual or automatic features for modifying a field of view or orientation thereof, e.g., by adjusting a focal length, an angular orientation, a level of zoom or a location of the imaging device 760.

The RFID reader 762 may be or comprise any device or component configured to receive RFID signals from an RFID tag or other RFID source or device that may be actively or passively coupled with the RFID reader 762. The RFID signals may include information or data stored within a microchip or other memory component or storage device associated with the RFID tag that is sent to the RFID reader 762. The transfer of the RFID signal may be initiated when an electric field or a magnetic field emitted by the RFID reader 762 is sensed by an RFID tag, which transmits the information or data stored in association with the RFID tag.

The scanner 764 may include any number of elements, components or features for capturing and interpreting one or more images of any kind of marking (e.g., one-dimensional or multi-dimensional bar codes, text, numbers, symbols, trademarks, shapes, outlines or figures) that may be known to those of ordinary skill in the pertinent arts, as well as any type of computing elements, components or features that may be required to capture or interpret such images. For example, the scanner 764 may be a passive scanner or reader configured to capture and store images for subsequent transmission to an external device (not shown) throughout a materials handling facility, or an active scanner or reader that captures, stores and transmits such images to the external device in real-time.

As is discussed above, when one or more items are placed into an expanded bag provided on a self-bagging cart, information or data may be captured therefrom and indexed, stored or otherwise evaluated. Referring to FIG. 7B, as an item 70 is placed into the expanded bag 740 by a user of the cart 700, the imaging device 760 may be configured to interpret one or more markings provided thereon (e.g., alphanumeric characters, bar codes or other markings), thereby identifying the item 70 and updating one or more inventory records based on the interpreted markings. For example, when the imaging device 760 identifies the item 70 as entering the expanded bag 740, a first inventory record associated with the materials handling facility may be updated to reflect that the item 70 is no longer available in stock at the materials handling facility, while a second inventory record associated with the user may be updated to reflect that the item 70 is now in the possession of the user. Conversely, those of ordinary skill in the pertinent arts will recognize that if the item 70 is recognized as being removed from the expanded bag 740 by the imaging device 760, e.g., if the user returns the item 70 to a shelf or other location at the materials handling facility, the first inventory record may be updated again to reflect that the inventory 70 has been returned to stock, and the second inventory record may be updated again to indicate that the item 70 is no longer in the possession of the user.

In addition to the imaging device 760, the cart 700 may include one or more other information-gathering or data-gathering systems or components that may be configured to capture information or data from items. For example, in some implementations, where the item 70 is equipped or configured to include an RFID tag or other RFID device, the RFID reader 762 may detect one or more RFID signals from the RFID tag and update records or take one or more other computer-based actions accordingly in view of such information or data. Alternatively, in some other implementations, the scanner 764 may read and interpret a bar code provided on an external surface of the item 70 and also take any associated computer-based actions in response to having added the item to the expanded bag 740 or removed the item from the expanded bag 740, as appropriate.

Those of ordinary skill in the pertinent arts will recognize that the self-bagging carts of the present disclosure may further include any type of computing devices, networked communication components or other features (not shown) that enable information or data captured using the imaging device 760, the RFID reader 762 or the scanner 764 to be processed, stored, transmitted to one or more external computers or systems via a computer network or deleted.

Figure 8A:
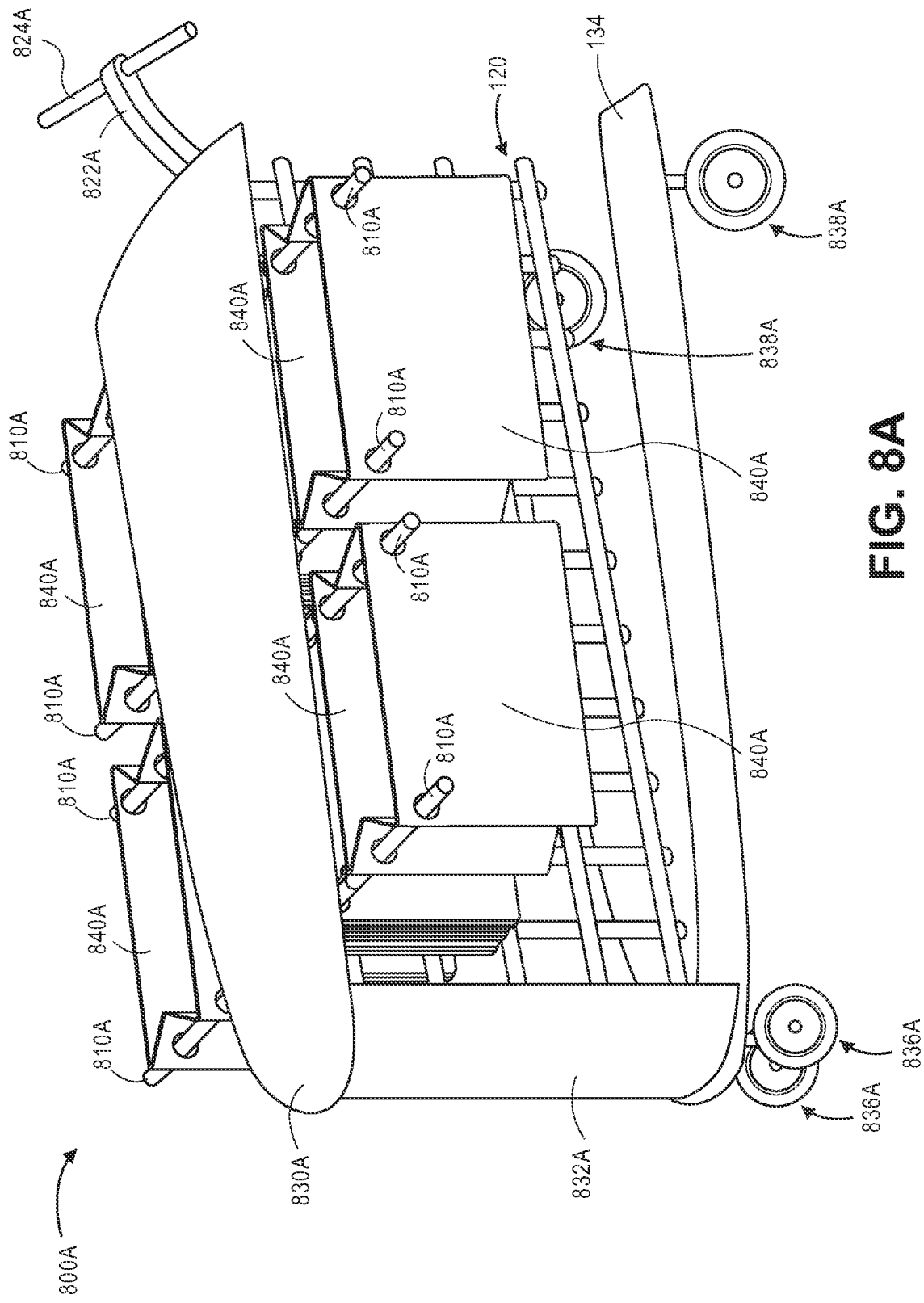
FIGS. 8A and 8B are views of components of self-bagging carts in accordance with implementations of the present disclosure.
Figure 8B:
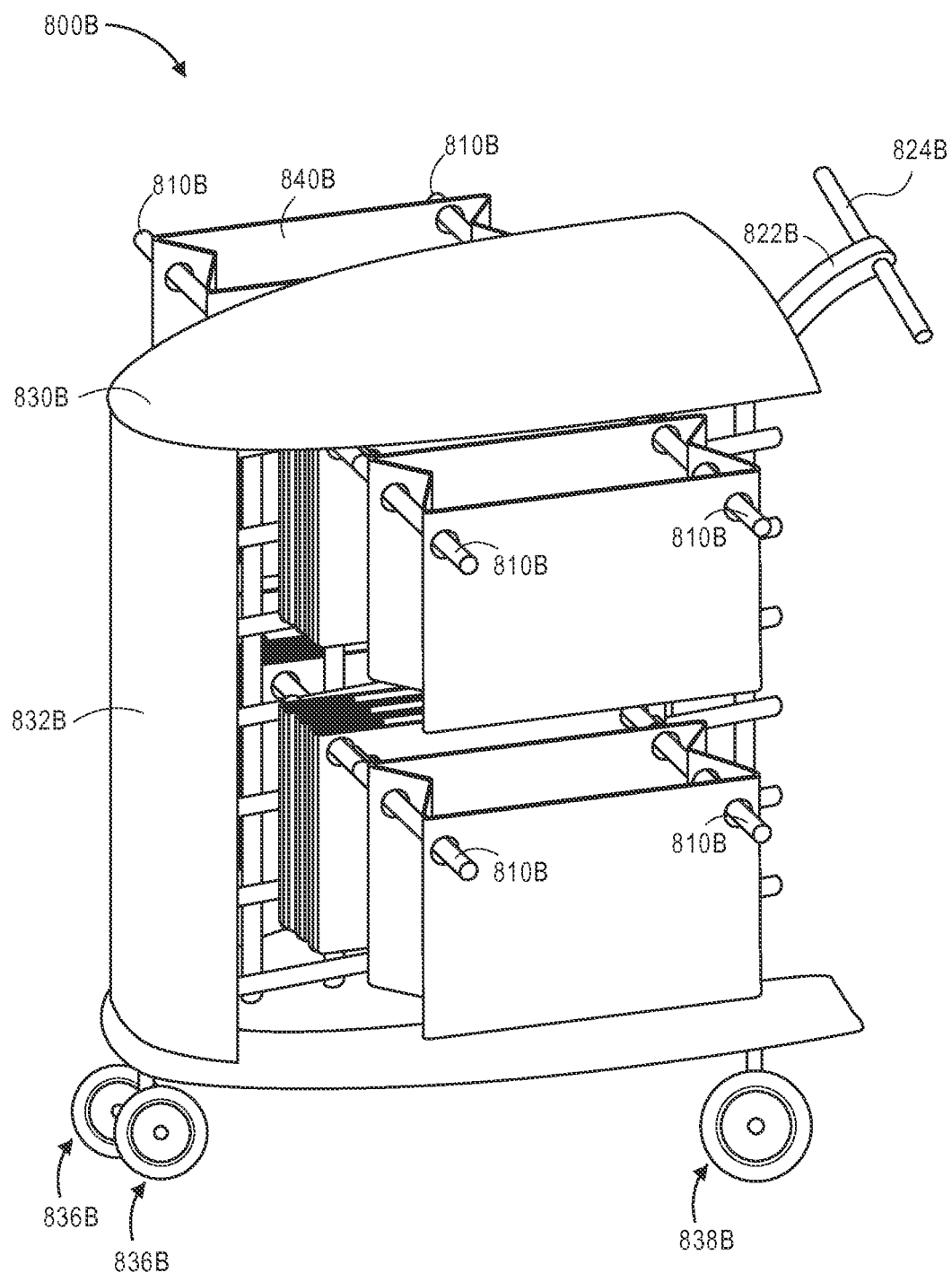

As is also discussed above, the self-bagging carts disclosed herein are not limited in their orientations or configurations. Implementations of such carts may include any number of arms for suspending bags thereon, and such arms may be provided in any configuration. Referring to FIGS. 8A and 8B, views of components of self-bagging carts 800A. 800B in accordance with implementations of the present disclosure are shown. Except where otherwise noted, reference numerals preceded by the number "8" shown in FIGS. 8A and 8B indicate components or features that are similar to components or features having reference numerals preceded by the number "7" shown in FIGS. 7A and 7B, by the number "6" shown in FIGS. 6A and 6B, by the number "5" shown in FIGS. SA through 5E, by the number "4" shown in FIGS. 4A through 4C, by the number "3" shown in FIGS. 3A and 3B, by the number "2" shown in FIGS. 2A through 2D or by the number "1" shown in FIGS. 1A through 1E.

As is shown in FIG. 8A, the cart 800A includes two sets of arms 810A provided on each of a left side and a right side of a frame 820A. Each of the sets of arms 810A is aligned substantially horizontally and may be configured to receive one or more bags 840A defining flexible carrying volumes thereon. Some of the bags 840A are collapsed and stored adjacent to the frame 820A, while others of the bags 840A are expanded and configured to receive one or more items of varying sizes or types therein. Implementations of self-bagging carts, such as the cart 800A of FIG. 8A, which include two or more sets of arms 810A provided on each side of a frame 820A in a substantially horizontal orientation, may thereby enhance not only the capacity of such carts (e.g., by providing more bags 840A, or larger bags 840A, the cart 800A may accommodate more or larger items therein) but also the diversity of such items (e.g., some bags 840A may be configured to receive and store items of varying volumes or surface areas, while some other bags 840A may be configured to receive and store items of varying temperatures or masses, or items including varying ingredients or materials) that may be received therein.

As is shown in FIG. 8B, the cart 800B also includes two sets of arms 810B provided on each of a left side and a right side of a frame 820B. Unlike the sets of arms 810A provided on the cart 800A of FIG. 8A, each of the sets of arms 810B provided on the cart 800B of FIG. 8B is aligned substantially vertically. Implementations of self-bagging carts, such as the cart 800B of FIG. 8B, which include two or more sets of arms 810B provided on each side of a frame 820B in a substantially vertical orientation, may provide an enhanced capacity and also enable the cart 800B to travel or be utilized in tighter quarters or areas where space may be limited or unavailable. Those of ordinary skill in the pertinent arts will recognize that the number of sets of arms, or bags that may be suspended from such sets of arms, that may be provided on self-bagging carts of the present disclosure is not limited.

Figure 9C:
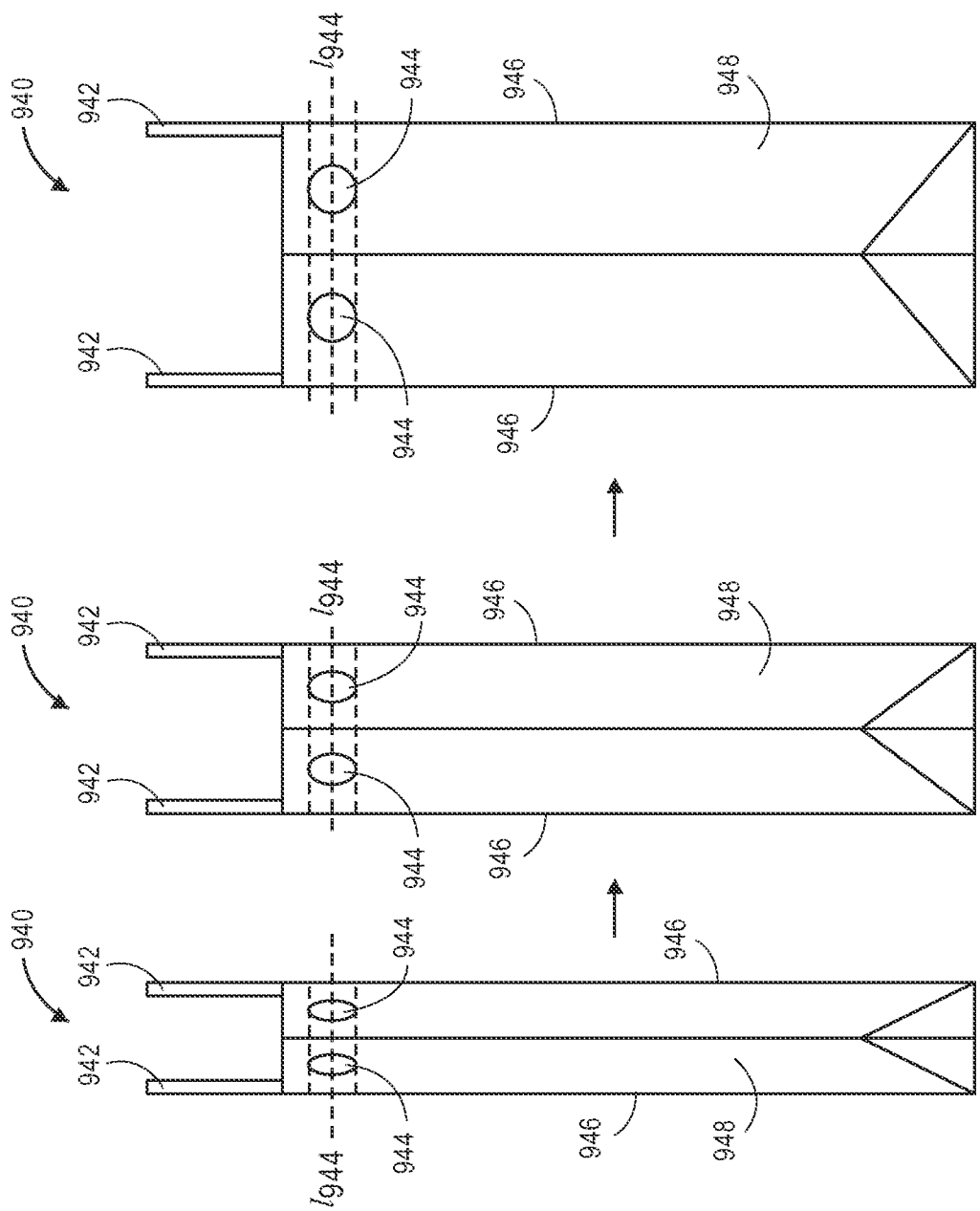

The bags or other item carriers that may be utilized in connection with the self-bagging carts of the present disclosure include one or more holes, slots or other features that are provided therein and configured to receive portions of arms extending from such self-bagging carts. In some implementations, the holes, slots or other features enable such bags to be stored on the same pair of arms regardless of whether the bags are collapsed or expanded. Referring to FIGS. 9A through 9C, views of one bag 900 in accordance with implementations of the present disclosure are shown. Except where otherwise noted, reference numerals preceded by the number "9" shown in FIGS. 9A through 9C indicate components or features that are similar to components or features having reference numerals preceded by the number "8" shown in FIGS. 8A and 8B, by the number "7" shown in FIGS. 7A and 7B, by the number "6" shown in FIGS. 6A and 6B, by the number "5" shown in FIGS. 5A through 5E, by the number "4" shown in FIGS. 4A through 4C, by the number "3" shown in FIGS. 3A and 3B, by the number "2" shown in FIGS. 2A through 2D or by the number "1" shown in FIGS. 1A through 1E.

As is shown in FIGS. 9A through 9C, the bag 940 defines a flexible carrying volume that is formed from a plurality of panels or layers and includes handles 942 and a plurality of holes 944 (or slots or other like features) extending therethrough. The bag 940 shown in FIGS. 9A through 9C is formed from a pair of main panels 946 (e.g., front or back panels) and a pair of side panels 948, and a bottom (not shown) of any type, shape or form. When the bag 940 is unfolded or expanded, the side panels 946 are extended, and the bag 940 defines an opening or cavity that may accommodate one or more items therein. When the bag 940 is folded or compressed, however, the side panels 948 are folded inwardly toward an interior of the bag 940, such that the opening or cavity defined by the bag 940 collapses as the side panels 948 are compressed between the two main panels 946, e.g., like an accordion. Those of ordinary skill in the pertinent arts will recognize that the main panels 946 and the side panels 948 may be formed from the same material, or from different materials, in accordance with the present disclosure.

The bag 940 may be formed from any suitable material that may be selected on any basis, including but not limited to fibrous fabrics formed at least in part from paper, cotton, recycled plastics, knitted, woven or non-woven fabrics, natural or synthetic leathers or canvases or other like materials. In some implementations, the bag 940 may be formed from woven fabrics including polypropylene or polyethylene, or from materials that are laminated on one or both sides, to reinforce or protect such materials and enable the bag 940 to be used, washed and reused on several occasions. In some other implementations, the bag 940 may be formed from blends of cotton or like materials and materials comprising recycled plastics, thereby providing the bags 940 with enhanced hydrophobicity to repel liquids or other stain-forming matter. Additionally, in some implementations, the bags 940 may be formed in a single-piece construction from a piece of fabric that is properly cut and shaped, and may be subsequently stitched or joined in order to define a flexible volume that may be suspended from a set of arms, and may collapse or be expanded thereon.

The handles 942 shown in FIG. 9A are formed from straps or strap-like elements that are secured to each of a front face and a rear face of the bag 940. One or more dimensions or attributes of the handles 942 (e.g., a length or number of the handles 942) may be selected to correspond with a particular use of a cart onto which the bag 940 may be suspended, or on any other basis. For example, the bag 940 may include a pair of long handles for carrying the bag about a shoulder or forearm, and/or a pair of short handles for carrying the bag by hand or for removing the bag from the arms from which the bag 940 is suspended. The handles 942 may include additional or fortified stitching in selected locations thereof, including about all or a portion of a perimeter of an opening for a hand, elbow or shoulder, or along all or a portion of a length of a strap.

Although the handles 942 of FIG. 9A are substantially strap-like in nature, those of ordinary skill in the pertinent arts will recognize that bags having any type of handle may be provided for use in connection with a self-bagging cart in accordance with the present disclosure. For example, according to some implementations, handles provided on a bag may constitute substantially planar elements defined by extensions, chords, bases or segments which are connected along opposing lengths of the bags. Although the handles 942 are substantially semicircular in shape, those of ordinary skill in the pertinent arts will recognize that straps or strap-like handles, such as the handles 942 of FIG. 9A, may be provided in any shape, including continuous arcs such as portions of circles, parabolas or ellipses, as well as discontinuous shapes such as portions of squares, rectangles or triangles. The handles 942 may further take the form of slots or other openings provided in one or more of the main panels 946 or the side panels 948 of the bag 940, including but not limited to slots adapted to accommodate one or more hands of a user. Additionally, those of ordinary skill in the pertinent arts will further recognize that the bags of the present disclosure need not include handles of identical or similar shapes or sizes, or that such handles need not be limited to the lengths, shapes or thicknesses of the handles 942 shown in FIG. 9A.

The holes 944 may be any slots, perforations or other openings extending through one or more panels of the bag 940. The holes 944 may be formed within such panels in any manner, e.g., by any punching, drilling, slicing, shearing, cutting or other like manual or automatic processes. One or more attributes of the holes 944, or the processes by which the holes 944 are formed, may be selected on any basis, including but not limited to attributes of the materials from which the bag 940 is formed, attributes of one or more arms of a self-bagging cart from which the bag 940 is to be suspended, or attributes of items that are expected to be placed within the bag 940 during operation. For example, where the bag 940 is formed from paper, the holes 944 may be provided in the bag 940 using shears, blades or other cutting devices. Where the bag 940 is formed from fabrics (e.g., woven or non-woven fabrics), the holes 944 may be cut, punched or otherwise carved therefrom. Where the bag 940 is formed from plastics, the holes 944 may be not only cut or punched but also melted or singed using one or heat sources.

Moreover, one or more of the holes 944 may further include more reinforcement devices or components, as necessary, to protect the integrity of the holes 944 or the bags 940 in response to wear-and-tear experienced during repeated usage. For example, in some implementations, reinforcement devices or components provided on one or more of the holes 944 may include, but are not limited to, perimeter stitching, grommets or eyelets (e.g., hardened parts lining the holes 944 that may be formed from rubbers, plastics or metals such as brass), lamination or any other like components or techniques. Alternatively, in some implementations, the holes 944 may be provided with reinforcement devices or components in the form of elastics or other features for contracting the holes 944 around an arm, or providing additional friction between the holes and the arm. Any systems or methods for forming bags, or defining or reinforcing holes within or through such bags, may be utilized in accordance with the present disclosure.

Dimensions or shapes of the holes 944 may be determined based on dimensions or shapes of arms of a self-bagging cart on which the bags 940 are intended for use. In accordance with the present disclosure, a separation $d_{944}$ and/or areas $A_{944}$ of the holes 944 on the bags 940 may be selected to correspond with a separation and areas $A_{944}$ of the arms on a cart, such as is shown in FIGS. 1A through 1E, to achieve a predetermined level of fit between the bags 940 and such arms. For example, in some implementations, the areas $A_{944}$ or other dimensions of the holes 944 may be formed or selected for the purpose of providing a clearance fit (e.g., a loose-running fit, a free running fit, a close-running fit, or a sliding fit) between the bags 940 and the arms when the bags 940 are expanded or collapsed, thereby enabling the bags 940 to be easily placed onto the arms, transitioned from a mounting section to an extension, or removed from the extension. Alternatively, in some other implementations, the areas $A_{944}$ or other dimensions of the holes 944 may be formed for the purpose of providing an interference fit (e.g., a locational interference fit or force fit) between the bags 940 and the arms when the bags 940 are expanded or collapsed, thereby requiring additional force to overcome friction between the holes 944 and the arms in order to place the bags 940 onto the arms or remove the bags 940 from the arms.

Each of the various panels of the bag 940 may be formed from a single layer, or from two or more layers, of one or more materials. As is shown in FIGS. 9A, 9B and 9C, the various panels of the bag 940 may be folded or creased in a manner that enables the bag 940 to be collapsed or expanded as necessary. For example, referring again to FIGS. 1A through 1E, some of the bags 140 that are suspended from the arms 110 are collapsed, e.g., closed and flattened in a predetermined manner and deposited on the mounting sections 112 of the arms 110, while other bags 140 that are suspended from the arms 110 are expanded, e.g., opened in a reciprocal manner and deposited on the extensions 114 of the arms 110, an of receiving one or more items therein. Thus, as is shown in FIG. 9B, when the bag 940 is folded or compressed, multiple panels of the bag are pressed against one another, at least some of the panels to be aligned in series with one another. Accordingly, as is also shown in FIGS. 9A, 9B and 9C, the holes 944 may be formed within the bags 940 in a collinear or coaxial manner, such that the holes 944 extend through each of such panels (e.g., through each of the main panels 946 and through each of the folds of a side panel 948) are aligned about a common line or axis $l_{944}$, and may accommodate a single arm extending therethrough. Those of ordinary skill in the pertinent arts will recognize that the holes 944 may be formed through one or more panels of the bag 940 without regard to whether such panels are folded or creased. For example, the holes 944 of the bag 940 may extend through one or more of the main panels 946, through one or more of the side panels 948, or through one or more of the main panels 946 and the side panels 948, and that the bag 940 may be suspended on one or more arms of a cart via such holes 944, in accordance with the present disclosure.

In some implementations, such as is shown in FIGS. 9B and 9C, the holes 944 may be formed of such shapes and dimensions within the bags 940 that the holes 944 remain coaligned about the arms regardless of whether the bags 940 are collapsed or expanded thereon. In this regard, a bag 940 may be slid onto a set of arms and stored in a folded or collapsed manner, e.g., onto the mounting sections 112 of the arms 110 of FIGS. 1A through 1E, until the bag 940 is needed for receiving and storing items therein. Subsequently, the bag 940 may be progressively opened, e.g., onto the extensions 114 of the arms 110 of FIGS. 1A through 1E, until the bag 940 has been fully expanded and readied for receiving and storing items therein.

The holes, slots or other features of the bags or other item carriers of the present disclosure may be sized and located to conform to corresponding arms provided on self-bagging carts. As is discussed above, the holes, slots or other features and the arms may take any shape or form. Referring to FIGS. 10A through 10C, views of bags 1040A, 1040B. 1040C in accordance with implementations of the present disclosure are shown. Except where otherwise noted, reference numerals preceded by the number "10" shown in FIGS. 10A through 9C indicate components or features that are similar to components or features having reference numerals preceded by the number "9" shown in FIGS. 9A through 9C, by the number "8" shown in FIGS. 8A and 8B, by the number "7" shown in FIGS. 7A and 7B, by the number "6" shown in FIGS. 6A and 6B, by the number "5" shown in FIGS. 5A through 5E, by the number "4" shown in FIGS. 4A through 4C, by the number "3" shown in FIGS. 3A and 3B, by the number "2" shown in FIGS. 2A through 2D or by the number "1" shown in FIGS. 1A through 1E.

As is shown in FIGS. 10A through 10C, the bags 1040A, 1040B, 1040C may include holes 1044A, 1044B, 1044C having sizes and dimensions corresponding to sizes and dimensions of arms 1010A, 1010B, 1010C provided on self-bagging carts of the present disclosure (not shown). For example, as is shown in FIG. 10A, the hole 1044A is provided in the form of an inverted tee, corresponding to the arm 1010A, which has a cross-section in the form of an inverted tee having a shape, orientation and dimensions that are similar to the shape and dimensions of the hole 1044A. As is shown in FIG. 10B, the hole 1044B is provided in the form of a five-pointed star, corresponding to the arm 1010B, which has a cross-section in the form of a five-pointed star having a shape, orientation and dimensions that are similar to the shape and dimensions of the hole 1044B. Finally, as is shown in FIG. 10C, the hole 1044C is provided in the form of an equilateral triangle, corresponding to the arm 1010C, which has a cross-section in the form of an equilateral triangle having a shape, orientation and dimensions that are similar to the shape and dimensions of the hole 1044C.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the implementations of the self-bagging carts disclosed herein are provided with wheeled casters, those of ordinary skill in the pertinent arts will recognize that such carts may be provided with any type or form of apparatus for translating the carts in any direction, including not only wheeled apparatuses but also sliding (e.g., skis or runners) or hovering (e.g., air-cushion vehicles or machines) apparatuses. Furthermore, although some other implementations of the self-bagging carts disclosed herein feature handles or other elements for manually pushing or pulling such carts, those of ordinary skill in the pertinent arts will also recognize that the carts may be motorized, and may include one or more motors (e.g., electric or gasoline-powered motors), power sources, navigation controls or other accommodations.

Moreover, the self-bagging carts of the present disclosure may be used in any type or form of materials handling facility, or like facility, and are not limited in their application or implementation. As used herein, a "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose.

Although some of the implementations of self-bagging carts disclosed herein feature pairs of arms for suspending bags therefrom, those of ordinary skill in the pertinent arts will recognize that the present disclosure is not so limited. Bags may be suspended from sets of arms of any number other than two, including one or three or more arms, and the bags may feature corresponding numbers of holes thereon. Additionally, although some of the implementations of self-bagging carts disclosed herein feature arms having extensions that may be rotated or folded, those of ordinary skill in the pertinent arts will recognize that the present disclosure is likewise not so limited. For example, the self-bagging carts of the present disclosure may feature sets of arms that may telescopically retract or extend, as needed.

The self-bagging carts of the present disclosure may also include other standard features or implements commonly found on other carts, including but not limited to one or more hooks onto which a bag may be placed when the bag is full, as well as collapsible or extendible child seats, cup holders, maps, tables or charts, or other like features or implements. Likewise, the self-bagging carts of the present disclosure need not be symmetrical, e.g., with sets of arms and bags suspended therefrom on left and right sides thereof. Rather, the self-bagging carts may feature bags suspended from a single side or face thereof, or bags that are unevenly or asymmetrically distributed on sides or faces thereof, in accordance with the present disclosure.

Additionally, the self-bagging carts of the present disclosure may also include bags of different sizes. For example, a self-bagging cart may include large bags suspended from a first set of arms, medium bags suspended from a second set of arms, and small bags suspended from a third set of arms. Likewise, bags of varying sizes may be suspended from a common set of arms. Moreover, the bags may include customized features based on the intended purpose or function of either the bags or carts. For example, the self-bagging carts may include one or more insulated bags for receiving hot or cold items, waterproof bags for receiving wet or moist items, mesh bags for receiving items requiring ventilation, reinforced bags for receiving heavy or sharp items, bags with one or more rigid or flexible dividers for separating items therein, or bags with zippers, locks or other securing features. Any type of bag or other flexible carrier having holes with shapes and dimensions that correspond to a set of arms extending from a self-bagging cart may be utilized in accordance with the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately." "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A first cart configured for travel on a surface, wherein the first cart comprises:
    a frame having a first member and a second member pivotably joined to a first frame hinge, wherein the first member and the second member are configured to pivot with respect to one another about an axis defined by the first frame hinge between an open alignment and a closed alignment, wherein the axis defined by the first frame hinge is aligned substantially perpendicular to the surface, wherein the first member comprises at least one first horizontal element substantially parallel to the surface and at least one first vertical element substantially perpendicular to the surface, and wherein the second member comprises at least one second horizontal element substantially parallel to the surface and at least one second vertical element substantially parallel to the surface;
    a first pair of arms mounted to the first horizontal element of the first member,
        wherein each arm of the first pair of arms extends laterally outward from the first member, substantially parallel to the surface and substantially parallel to one another,
        wherein each arm of the first pair of arms comprises a first mounting section at a first proximal end, a first extension at a first distal end, a first arm hinge joining the first mounting section and the first extension, and a first torsion spring,
        wherein each arm of the first pair of arms is rigidly mounted to the at least one first horizontal element of the first member by the first mounting section at the first proximal end,
        wherein the first extension is configured to rotate, about an axis defined by the first arm hinge, between a first position substantially coaxial with the first mounting section and a second position substantially perpendicular to the first mounting section, and
        wherein the first torsion spring urges the first extension into the first position;
    a second pair of arms mounted to the second horizontal element of the second member,
        wherein each arm of the second pair of arms extends laterally outward from the second member, substantially parallel to the surface and substantially parallel to one another,
        wherein each arm of the second pair of arms comprises a second mounting section at a second proximal end, a second extension at a second distal end and a second arm hinge joining the second mounting section and the second extension, and a second torsion spring,
        wherein each arm of the second pair of arms is rigidly mounted to the at least one second horizontal element of the second member by the second mounting section at the second proximal end,
        wherein the second extension is configured to rotate about an axis defined by the second arm hinge between a third position substantially coaxial with the second mounting section and a fourth position substantially perpendicular to the second mounting section, and
        wherein the second torsion spring urges the second extension into the third position;
    at least one front caster mounted to at least one of the first member or the second member; and
    at least one rear caster mounted to at least one of the first member or the second member.

2. The first cart of claim 1, further comprising:
    a first plurality of bags suspended from the first pair of arms,
        wherein each of the first plurality of flexible item carriers comprises a first mounting hole and a second mounting hole extending laterally therethrough, and wherein each of the first pair of arms extends through one of the first mounting hole or the second mounting hole,
        wherein each of the first pair of arms has a first cross-sectional attribute,
        wherein each of the first mounting holes and the second mounting holes of the flexible item carriers has a second cross-sectional attribute corresponding to the first cross-sectional attribute,
        wherein each of the first plurality of item carriers is adapted to be folded into a collapsed condition and unfolded into an expanded condition,
        wherein at least one of the first plurality of flexible item carriers is suspended from the first mounting sections of the first pair of arms in the folded condition, and
        wherein one of the first plurality of flexible item carriers is suspended from the first extensions of the first pair of arms in the expanded condition.

3. The first cart of claim 1, further comprising:
    a cover mounted to at least one of the first member and the second member, wherein the cover extends over at least a portion of the first horizontal element and at least a portion of the first mounting section of at least one of the first pair of arms, wherein the cover extends over at least a portion of the second horizontal element and at least a portion of the second mounting section of at least one of the second pair of arms, and wherein the cover does not extend over at least a portion of the first extension of the at least one of the first pair of arms or at least a portion of the second extension of the at least one of the second pair of arms;
a first handle mount joined to a rear portion of the first member;
a second handle mount joined to a rear portion of the second member; and
a handle joined to the first handle mount and the second handle mount.

4. The first cart of claim 1, wherein the first member and the second member form an external shape of the first cart when the first frame member and the second frame member are in the closed alignment,
wherein at least a first portion of the external shape of the first cart conforms to at least a second portion of an interior cavity of a second cart, and
wherein the first portion of the external shape of the first cart is configured to be received within the second portion of the interior cavity of the second cart.

5. A mobile apparatus comprising:
a frame comprising a first vertical frame member comprising at least one first horizontal element rigidly joined perpendicular to at least one first vertical element and a second vertical frame member comprising at least one second horizontal element rigidly joined perpendicular to at least one second vertical element, wherein the first vertical frame member and the second vertical frame member are joined to one another by a frame hinge, and wherein the first vertical frame member and the second vertical frame member are adapted to rotate with respect to one another about an axis defined by the frame hinge between an open alignment of the frame and a closed alignment of the frame;
a first arm mounted to the first vertical frame member, wherein the first arm comprises a first mounting section rigidly joined to one of the at least one first horizontal element or the at least one first vertical element and extending laterally from the first vertical frame member;
a second arm mounted to the first vertical frame member, wherein the second arm comprises a second mounting section rigidly joined to one of the at least one first horizontal element or the at least one first vertical element and extending laterally from the first vertical frame member in parallel to the second arm; and
a first flexible item carrier comprising a first plurality of panels, a first set of lateral openings through at least two of the first plurality of panels along a first common axis and a second set of lateral openings through at least two of the first plurality of panels along a second common axis,
wherein the first arm extends through the first set of lateral openings,
wherein the second arm extends through the second set of lateral openings,
wherein at least one cross-sectional attribute of the first set of lateral openings corresponds to at least one cross-sectional attribute of the first arm, and
wherein at least one cross-sectional attribute of the second set of lateral openings corresponds to at least one cross-sectional attribute of the second arm.

6. The mobile apparatus of claim 5, wherein the first arm further comprises a first extension and a first arm hinge rotatably joining the first mounting section and the first extension.

7. The mobile apparatus of claim 6,
wherein the first extension is adapted to rotate about a first axis defined by the first arm hinge between a first position substantially perpendicular to the first vertical frame member and a second position substantially parallel to the first vertical frame member.

8. The mobile apparatus of claim 7, wherein the first arm further comprises a biasing element aligned to bias the first extension into the first position.

9. The mobile apparatus of claim 8, wherein the biasing element comprises at least one of a torsion spring or a pulley.

10. The mobile apparatus of claim 6,
wherein the first extension comprises a first distal end at a first elevation with respect to the first vertical frame member and a first proximal end at a second elevation with respect to the first vertical frame member, and
wherein the second elevation is greater than the first elevation.

11. The mobile apparatus of claim 6, wherein the frame further comprises a second vertical frame member comprising at least one second horizontal element rigidly joined perpendicular to at least one second vertical element,
wherein the second arm further comprises a second extension and a second arm hinge joining the second mounting section and the second extension,
wherein the mobile apparatus further comprises:
a third arm mounted to the second vertical frame member, wherein the third arm comprises a third mounting section rigidly joined to one of the at least one second horizontal element or the at least one second vertical element and extending laterally from the second vertical frame member, a third extension and a third arm hinge joining the third mounting section and the third extension,
a fourth arm mounted to the second vertical frame member, wherein the fourth arm comprises a fourth mounting section rigidly joined to one of the at least one second horizontal element or the at least one vertical element and extending laterally from the second frame member in parallel to the third arm, a fourth extension and a fourth arm hinge joining the fourth mounting section and the fourth extension, and
a second item carrier comprising a second plurality of panels, a third set of lateral openings through at least two of the second plurality of panels along a third common axis and a fourth set of lateral openings through at least two of the second plurality of panels along a fourth common axis,
wherein the first arm and the second arm are separated by a first predetermined distance,
wherein the first common axis and the second common axis are separated by the first predetermined distance,
wherein the third arm and the fourth arm are separated by a second predetermined distance,
wherein the third common axis and the fourth common axis are separated by the second predetermined distance.

12. The mobile apparatus of claim 5,
wherein the frame forms an external shape and defines an interior cavity when the frame is in the open alignment, and
wherein a first portion of the external shape corresponds to a second portion of the interior cavity.

13. The mobile apparatus of claim 5, further comprising a cover mounted to at least one of the first vertical frame member or the second vertical frame member, wherein the cover extends over at least a portion of the first mounting section of the first arm,
wherein the cover extends over at least a portion of the second mounting section of the second arm,
wherein the cover does not extend over at least a portion of the first extension of the first arm, and
wherein the cover does not extend over at least a portion of the second extension of the second arm.

14. The mobile apparatus of claim 5, further comprising:
at least one shield mounted to at least one of the first vertical frame member or the second vertical frame member,
at least one wheel caster mounted to at least one of the first vertical frame member or the second vertical frame member, and
at least one guard provided between the at least one wheel caster and the flexible item carrier.

15. The mobile apparatus of claim 5, wherein the at least one first horizontal element and the at least one first vertical element of the first vertical frame member comprise a first plurality of horizontal elements and a first plurality of vertical elements provided in one of a grid or a lattice, and
wherein at least one of the first plurality of horizontal elements and at least one of the plurality of vertical elements is formed from at least one of a plastic, a wood, a metal or a composite material.

16. The mobile apparatus of claim 5, further comprising at least one sensing device mounted to a portion of the frame,
wherein the at least one sensing device is configured to capture information or data regarding at least a portion of the flexible item carrier, and
wherein the at least one sensing device is at least one of an imaging device, an RFID reader or a scanner.

17. The mobile apparatus of claim 5, wherein the at least one cross-sectional attribute of the first set of lateral openings is a first shape,
wherein the at least one cross-sectional attribute of the second set of lateral openings is the first shape,
wherein the at least one cross-sectional attribute of the first arm is a second shape, and
wherein the at least one cross-sectional attribute of the second arm is the second shape.

18. A mobile self-bagging cart comprising:
a frame comprising a first vertical frame member comprising at least one first horizontal element rigidly joined perpendicular to at least one first vertical element and a second vertical frame member comprising at least one second horizontal element rigidly joined perpendicular to at least one second vertical element,
wherein the first vertical frame member and the second vertical frame member are joined to one another by a frame hinge, and wherein the first vertical frame member and the second vertical frame member are adapted to rotate with respect to one another about an axis defined by the frame hinge between an open alignment of the frame and a closed alignment of the frame;
a pair of arms comprising a first arm and a second arm,
wherein the first arm comprises a first mounting section at a first proximal end of the first arm, a first extension at a first distal end of the first arm, and a first arm hinge joining the first mounting section and the first extension,
wherein the second arm comprises a second mounting section at a second proximal end of the second arm, a second extension at a second distal end of the second arm, and a second arm hinge joining the second mounting section and the second extension,
wherein the first mounting section is rigidly joined to and extends substantially normal from at least a first portion of the frame,
wherein the second mounting section is rigidly joined to and extends substantially normal from at least a second portion of the frame, and
wherein the first mounting section and the second mounting section are aligned in parallel and separated by a predetermined horizontal distance;
a first bag suspended from the first mounting section and the second mounting section in a collapsed condition,
wherein the first bag is formed from a first plurality of panels,
wherein the first bag includes a first plurality of holes and a second plurality of holes extending through at least two of the first plurality of panels,
wherein each hole of the first plurality of holes is aligned along a first common axis,
wherein each hole of the second plurality of holes is aligned along a second common axis,
wherein the first common axis and the second common axis are aligned in parallel and separated by the predetermined horizontal distance,
wherein each hole of the first plurality of holes comprises a reinforcement device about a perimeter of the hole;
wherein each hole of the second plurality of holes comprises a reinforcement device about a perimeter of the hole;
wherein the first mounting section extends through each of the first plurality of holes, and
wherein the second mounting section extends through each of the second plurality of holes; and
a second bag suspended from the first extension and the second extension in an expanded condition,
wherein the second bag is formed from a second plurality of panels,
wherein the second bag includes a third plurality of holes and a fourth plurality of holes extending through at least two of the second plurality of panels,
wherein each hole of the third plurality of holes is aligned along a third common axis,
wherein each hole of the fourth plurality of holes is aligned along a fourth common axis,
wherein the third common axis and the fourth common axis are aligned in parallel and separated by the predetermined horizontal distance,
wherein each hole of the third plurality of holes comprises a reinforcement device about a perimeter of the hole;
wherein each hole of the fourth plurality of holes comprises a reinforcement device about a perimeter of the hole;
wherein the first extension extends through each of the third plurality of holes, and
wherein the second extension extends through each of the fourth plurality of holes.

19. The mobile self-bagging cart of claim 18, wherein the first extension is configured to rotate about a first axis defined by the first arm hinge between a first position parallel to the first mounting section and a second position perpendicular to the first mounting section, and
wherein the second extension is configured to rotate about a second axis defined by the second arm hinge between a third position parallel to the second mounting section and a fourth position perpendicular to the second mounting section.

20. A first cart comprising:
a first frame member having at least a first portion, a second portion, and at least a first wheel caster;
a second frame member having at least a third portion, a fourth portion, and at least a second wheel caster;
a first frame hinge joining the first frame member and the second frame member, wherein the first frame member and the second frame member are configured to pivot with respect to one another about a first axis defined by the first frame hinge between a closed alignment and an open alignment, wherein the first axis is substantially vertical, wherein each of the first portion and the third portion is parallel to the first axis, and wherein each of the second portion and the fourth portion is approximately perpendicular to the first axis; and
at least one arm mounted to the second portion of the first frame member, wherein the at least one arm comprises a mounting section at a proximal end, wherein the mounting section is joined to the second portion of the first frame member, and wherein the mounting section extends laterally outward from the second portion of the first frame member,
wherein an interior shape defined by the first frame member and the second frame member in the open alignment is substantially similar to an external shape of a second cart in an open alignment, and
wherein the second cart comprises:
a third frame member having at least a fifth portion, a sixth portion and at least a third wheel caster;
a fourth frame member having at least a seventh portion, an eighth portion and at least a fourth caster; and
a second frame hinge, wherein the third frame member and the fourth frame member are configured to pivot with respect to one another about a second axis defined by the second frame hinge between a closed alignment and the open alignment.

21. The first cart of claim 20, wherein the at least one arm further comprises an extension at a distal end and an arm hinge joining the mounting section and the extension,
wherein the mounting section is joined to the second portion of the first frame member, and
wherein the extension is configured to rotate about a second axis defined by the arm hinge between a first position substantially coaxial with the mounting section and a position substantially parallel to the second portion of the first frame member.

* * * * *